US012786104B2

(12) United States Patent
Wright

(10) Patent No.: US 12,786,104 B2
(45) Date of Patent: Nov. 3, 2026

(54) COMPUTER-IMPLEMENTED METHODS AND SYSTEMS FOR IMPROVED COMMUNICATIONS ACROSS A BLOCKCHAIN NETWORK

(71) Applicant: nChain Licensing AG, Zug (CH)

(72) Inventor: Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 32 days.

(21) Appl. No.: 19/106,593

(22) PCT Filed: Sep. 5, 2023

(86) PCT No.: PCT/EP2023/074281
§ 371 (c)(1),
(2) Date: Feb. 25, 2025

(87) PCT Pub. No.: WO2024/052323
PCT Pub. Date: Mar. 14, 2024

(65) Prior Publication Data
US 2026/0067202 A1 Mar. 5, 2026

(30) Foreign Application Priority Data

Sep. 9, 2022 (GB) ...................................... 2213203
Oct. 7, 2022 (GB) ...................................... 2214776
(Continued)

(51) Int. Cl.
*H04L 45/16* (2022.01)
*H04L 9/00* (2022.01)
*H04L 45/74* (2022.01)

(52) U.S. Cl.
CPC ................ *H04L 45/16* (2013.01); *H04L 9/50* (2022.05); *H04L 45/74* (2013.01)

(58) Field of Classification Search
None
See application file for complete search history.

(56) References Cited

U.S. PATENT DOCUMENTS 6,611,872 B1 * 8/2003 McCanne ........... H04L 12/1836 370/390
7,221,660 B1 * 5/2007 Simonson ............... H04L 12/18 370/312
(Continued)

FOREIGN PATENT DOCUMENTS

GB 2621808 A 2/2024
WO 2018234987 A1 12/2018
WO 2023148042 A1 8/2023

OTHER PUBLICATIONS

GB2302252.8 Combined Search and Examination Report dated Aug. 8, 2023, 7 pages.
(Continued)

*Primary Examiner* — Backhean Tiv
(74) *Attorney, Agent, or Firm* — Galvani Smith PLLC; Rowan P. Smith

(57) ABSTRACT

Methods and techniques are provided that employ multicast transmission and anycast transmission to coordinate and distribute tasks and/or processing requests amongst groups of resources on a network. In one embodiment, the groups of resources can include nodes or other resources of a blockchain network that implement all or part of a particular blockchain protocol (e.g., Bitcoin SV protocol), and/or service providers that provide services to a blockchain-related organisation, group or network.

14 Claims, 16 Drawing Sheets

(30) Foreign Application Priority Data

| | | |
|---|---|---|
| Oct. 18, 2022 | (GB) | 2215419 |
| Dec. 2, 2022 | (GB) | 2218148 |
| Dec. 14, 2022 | (GB) | 2218881 |
| Dec. 23, 2022 | (GB) | 2219677 |
| Feb. 17, 2023 | (GB) | 2302252 |

(56) References Cited

U.S. PATENT DOCUMENTS

| | | | | |
|---|---|---|---|---|
| 8,103,797 | B2 * | 1/2012 | Day | G06F 21/10 709/224 |
| 10,757,020 | B2 * | 8/2020 | Morris | H04L 45/02 |
| 11,405,373 | B2 * | 8/2022 | McMurdie | H04L 9/0833 |
| 11,431,671 | B2 * | 8/2022 | Kempf | H04L 61/5007 |
| 2019/0149449 | A1 * | 5/2019 | Morris | H04L 45/02 709/245 |
| 2026/0067202 | A1 * | 3/2026 | Wright | H04L 45/122 |
| 2026/0067203 | A1 * | 3/2026 | Wright | H04L 45/16 |
| 2026/0074912 | A1 * | 3/2026 | Wright | H04L 9/3247 |

OTHER PUBLICATIONS

PCT/EP2023/074281, International Search Report and Written Opinion dated Nov. 17, 2023, 13 pages.

Zergpool; "Zergpool Mining—multialgo, multicoin, autoexchange pool, solo/party mining, BTC/LTC/BCH/DASH/DOGE/ETH payouts"; URL: https://web.archive.org/web/20230207135049/https://zergpool.com/ [accessed Aug. 2, 2023].

* cited by examiner

Validated by running: Alice's locking script (from output of $Tx_0$), together with Bob's unlocking script (as input to $Tx_1$). This checks that Bob's unlocking script in $Tx_1$ meets the condition(s) defined in Alice's locking script in $Tx_0$.

COMPUTER-IMPLEMENTED METHODS AND SYSTEMS FOR IMPROVED COMMUNICATIONS ACROSS A BLOCKCHAIN NETWORK

CROSS REFERENCE TO RELATED APPLICATIONS

This application is the U.S. National Stage of International Application No. PCT/EP2023/074281 filed on Sep. 5, 2023, which claims the benefit of United Kingdom Patent Application No. 2213203.9 filed on Sep. 9, 2022, United Kingdom Patent Application No. 2214776.3 filed on Oct. 7, 2022, United Kingdom Patent Application No. 2215419.9 filed on Oct. 18, 2022, United Kingdom Patent Application No. 2218148.1 filed on Dec. 2, 2022, United Kingdom Patent Application No. 2218881.7 filed on Dec. 14, 2022, United Kingdom Patent Application No. 2219677.8 filed on Dec. 23, 2022, and United Kingdom Patent Application No. 2302252.8 filed on Feb. 17, 2023, the contents of which are all incorporated herein by reference in their entireties.

TECHNICAL FIELD

Embodiments disclosed herein relate to improvements for transmission of data across a computer-implemented network. Embodiments are particularly suited for, but not limited to, transmission of blockchain-related data between resources/entities that receive, process and/or store such data.

BACKGROUND

Devices on the Internet are assigned a unique identifier (address) that allows them to be identified and located on the network by other devices. The initial IP protocol was built with the expectation that the number of IP addresses that could be generated from the 32 bit length address block would be sufficient to uniquely identify all of the devices that would connect to the Internet. However, neither the enormous private and commercial appeal of the Internet, nor the variety and quantity of devices that would seek to connect to it, was conceivable when the initial IP protocol was designed. As a result, it became evident over time with the growth in personal computing and mobile computation technology that the 4.3 billion addresses that are possible with IPv4 was insufficient.

While the threat of exhaustion of IPv4 addresses led to some creative ways of mitigating the limited set (e.g., Classless Inter-Domain Routing (CIDR), Unnumbered interface, and network address translation), these measures were not sufficient to address the issue. The advent of Internet of Things (IoT) exacerbated the limitations of IPv4 even further in the near and long term.

Due to these challenges, IPv6 was proposed as a replacement for the IPv4 address standard. Central to IPv6 was its use of a 128 bit address which can theoretically produce $3.4\times10^{38}$ addresses. While several ranges of the key space are pre-designated for specific purposes, the remaining address space is large enough to meet current and future needs of each resource that connects to the Internet having its own unique IPv6 address. Although the most significant advantage of IPv6 is that of a larger address space, there are several other advantages that IPv6 is expected to provide. These include the IPv6 approach toward multicasting and anycasting.

Multicasting (or multicast transmission), which enables the transmission of a data packet to multiple destinations in a single send operation, is native to the base specification of IPv6. For IPv6 multicasting, packets are sent to a multicast address corresponding to a group of devices; the packets are then routed for delivery to all of the devices of the group. On the other hand, an IPv6 anycast transmission (or anycast transmission), enables a source resource to send a data packet to an anycast address corresponding to a group of devices, but the packet is routed for delivery to only one device of the group (the device that is topologically closest to the sender).

The incorporation of multicasting and anycasting in the IPv6 protocol leads to greater efficiencies in transmission of data packets across the Internet and less network congestion in comparison with other ways of transmitting/casting packets such as unicasting and broadcasting. Unicasting is a one-to-one connection where a packet is sent from one IP address to another. Broadcasting is a one-to-all transmission where a packet is sent to all addresses/nodes in the network. Thus, the use of multicasting and anycasting in IPv6 can provide a more efficient and scalable solution for transmitting data over the Internet.

Beyond just the Internet, the need for efficient transfer of data transmission is also critical for other data networks. For example, scalability is a significant technical challenge for many distributed ledgers given the limited maximum size of blocks that they utilise (e.g., BTC's 1 MB block limitation). As such protocols require that more, smaller blocks be propagated through the network, the network becomes congested and slows down. Transactions take longer to be mined and confirmed. Network performance is degraded and the system's impaired functionality results in the BTC ledger being impractical for use with applications that require fast processing capabilities.

On the other hand, the Bitcoin SV protocol allows the use of larger blocks (currently 4 GB and are progressing towards terabyte blocks). The technical challenge arises of how to distribute these larger blocks across the nodes in the ledger's network of nodes in a swift, secure and efficient way. Therefore, in respect of blockchain-related applications, there is a need for technical solutions which provide improved blockchain networks, greater efficiencies in terms of time, processing resources and network performance.

A solution has now been devised which address at least these and other technical problems.

Terminology

As known in the prior art, the term "node" can mean a basic unit of a data structure (in Computer Science), or a point of connection in a communication network (networking/telecoms), an entity in a mesh network, or a computing resource that runs an implementation of a blockchain protocol, e.g., a miner on the Bitcoin network. Alongside these, a device or system on a network can also be called a "host" or "peer", depending on the context. In relation to the present disclosure there is, therefore, a potential for confusion between the various terms given that certain embodiments may encompass or intersect across various technical fields.

Therefore, to avoid confusion and for the sake of clarity, we will use the umbrella term "network resource" "processing resource", "computer-based resource" or simply "resource" to include "node", "peer" or "host", or any device/system on a network. Herein, we prefer to use the term "node" as typically meaning (but not necessarily limited to) a node on a blockchain network, e.g. a miner.

Also, we may refer herein to the Bitcoin protocol/network/ledger for the sake of convenience and because it is the most widely known of such technologies. However, the disclosure is not limited to use with Bitcoin and other ledger-based protocols/networks are intended to fall within the scope of the disclosure. For example, blockchain protocols, networks and implementations that comprise a Proof-of-Stake mechanism, or utilise an account-based model rather than UTXO-based, also fall within the scope of the present disclosure. It should also be noted that "Bitcoin" is not limited to any particular Bitcoin-related protocol, and any protocol or implementation flowing from, varying from or deviating from the original Bitcoin protocol is intended to fall within the scope of the disclosure.

The term "blockchain-related data" as used herein includes, but is not limited to, any data which is used, transmitted, received, stored or otherwise processed in respect of an operation, functionality or service performed in respect of, or for the purpose of implementing, a blockchain protocol or blockchain-based application. Public, private or permissioned blockchains also fall within the scope of the present disclosure.

SUMMARY

Embodiments of the disclosure provide solutions for the transmission of data across a network. Preferably:

- the solutions can use data communication in accordance with IPv6; and/or
- the data can be blockchain-related data but is not limited for use only with regard to blockchains and blockchain-related data; and/or
- the network can be a distributed network such as, for example, a ledger (blockchain) network, or any Peer-to-Peer (P2P) network.

In an example embodiment of the disclosure, network resources may be associated to form one or more multicast groups, each multicast group having its own, respective multicast address. A multicast address is a logical, collective identifier for the network resources in the multicast group so that all network resources of the multicast group receive data packets sent from a sending resource via multicast transmission directed to the multicast address. In some embodiments, the multicast address can be an IPv6 multicast address or an IPv4 multicast address, and the data packets are sent and received over the Internet.

In one particularly advantageous example, the disclosure can involve sending data from a sending resource to a multicast group of receiving resources. In a preferred embodiment, the data relates to at least part of a blockchain block and/or blockchain transaction. In such an example, the sending resource only has to send the data once for all intended receiving resources to receive a copy, rather than sending multiple times to each individual receiving resource as per unicast.

In one or more embodiments, the group of receiving resources may form an overlay network. The overlay network may be an overlay relative to a blockchain network that is associated with a given blockchain protocol. The blockchain network may comprise full blockchain nodes, each of which run a client in accordance with the protocol, and which perform at least one of: mining, validation, consensus and blockchain maintenance functions in accordance with and specified by the blockchain protocol. In some embodiments, a full node may comprise a mempool for storage of transactions prior to them being written to the blockchain ledger, as described below and known in the art. Additionally, or alternatively, the full blockchain node may be substantially as described below and in reference to accompanying FIGS. 1 to 4 as blockchain node 104. In one or more embodiments, one some or all of the receiving resources are not full nodes on the blockchain network. In one or more embodiments disclosed herein, one some or all of the receiving resources may be operative to perform a subset of the protocol-specified functions that the full blockchain nodes run.

The receiving resources in each multicast group can be of various types, forms, configurations or purpose, and the sending resource may be a member of the multicast group or external to it. The disclosure is not intended to be limited as to the type or nature of the data being sent, or the purpose for which it is sent. In one or more embodiments, however, one, some or all of the sending and/or receiving nodes in a group may be full nodes on a blockchain network, or nodes on an overlay network, and the data may comprise data relating to unconfirmed transactions that have been verified but not yet written to the blockchain ledger. In such an embodiment, systems and methods may be provided for implementing a mempool in or associated with a blockchain network or an overlay network that interacts with the blockchain network.

Advantageous applications of the disclosure can include, not least, the ability to send data to multicast groups of network resources which provide distributed and/or parallelised blockchain related functionalities. Such functionalities could, for example, be mining functionalities, on-chain searching functionalities, validation functionalities, calculation providers such as service providers that perform Proof-of-Work calculations and outputs, or work relating to Proof-of-Stake etc.

In another example embodiment of the disclosure, network resources may be associated to form one or more anycast groups, each anycast group having its own, respective anycast address. An anycast address is a logical, collective identifier for the network resources in the anycast group so that one network resource of the anycast group (which is typically the network resource topologically closest to the sending resource) will receive data packets sent from a sending resource to the anycast address. In some embodiments, the anycast address can be an IPv6 anycast address, and the data is sent and received over the Internet.

In one particularly advantageous example, the disclosure can involve sending data from a sending resource to an anycast group of receiving resources, and the data relates to at least part of blockchain block and/or blockchain transaction. In such an example, the sending resource sends the data to the anycast address of the group and routing functionality routes the data to one network resource of the anycast group (which is typically the network resource topologically closest to the sending resource) without requiring that the sending resource determine or select the individual receiving resource as per unicast. The receiving resources in the anycast group can be of various types, forms, configurations or purpose, and the sending resource may be a member of the anycast group or external to it. The disclosure is not intended to be limited as to the type or nature of the data being sent, or the purpose for which it is sent.

Advantageous applications of the disclosure can include, not least, the ability to send data to one or more anycast groups of network resources which provide distributed and/or parallelised blockchain related functionalities. Such functionalities could, for example, be mining functionalities, on-chain searching functionalities, validation functionalities etc. At least one of the technical objectives of the present disclosure may be to enhance scalability of a blockchain network and/or the scalability of an overlay network that functions as an overlay on top of an (underlying) blockchain network. The underlying blockchain network may be a peer-to-peer (P2P) network 106 as described herein and with reference to FIGS. 1 to 4. In accordance with embodiments of the disclosure, at least one or some of the technical improvements provided may relate not just to faster or more efficient prorogation of transactions as they travel through the conventional (underlying) blockchain network, but to improved throughput of transactions or blocks or parts thereof.

In embodiments, methods and techniques are provided that employ multicast transmission and anycast transmission to coordinate and distribute tasks and/or processing requests amongst groups of resources on a network. In one embodiment, the groups of resources can include nodes or other resources of a blockchain network that implement all or part of a particular blockchain protocol (e.g., Bitcoin SV protocol).

In embodiments, the methods and techniques can involve sending data (e.g., at least one data packet) across an electronic network from one or more sending resources to one or more receiving resources. The one or more receiving resources may be members of a multicast group that is associated with a particular multicast address; additionally, the one or more of the sending resources may be members of an anycast group that is associated with a particular anycast address.

In embodiments, the methods and techniques can further involve at least one of:

- associating a first group of resources with an anycast group having a particular anycast address; and/or
- associating a second group of resources with a multicast group having a particular multicast address; and/or
- sending an initial message (i.e., one or more data packets) from a sending resource to the particular multicast address corresponding to multicast group, the sending resource can belong to the anycast group or not, and the initial message including i) the particular anycast address for the anycast group and ii) data that relates to one or more tasks or processing requests; and/or
- routing the initial message to each resource of the multicast group.

The phrase "assigning a group of resources with a multicast group" means that the resources subscribe to (i.e. join) the multicast group as known in the art and as explained herein.

In embodiments, the methods and techniques can further involve, in response to receiving data (i.e., an initial message), at least one resource belonging to the multicast group (receiving resources) sending a response message (e.g., at least one data packet) to a particular anycast address corresponding to the anycast group, wherein the response message communicates an intent or willingness to perform or fulfil the one or more tasks or processing requests related to the received data (i.e., initial message).

In embodiments, the methods and techniques can further involve at least one of:

- routing the response message to one resource of the anycast group that is topologically closest to the resource of the multicast group that sent the response message; and/or
- in response to receiving a response message, at least one resource(s) of the anycast group determining which resource of the multicast group (receiving resources) that has sent a response message is topologically closest to the resource of the anycast group; and/or
- the resource(s) of the anycast group using a traceroute utility to determine which resource of the multicast group that has sent a response message is topologically closest to the resource of the anycast group uses; and/or
- at least one resource(s) of the anycast group cooperating with such topologically closest resource of the multicast group (receiving resources) to provide performance of the one or more tasks or processing requests related to the initial message and response message; and/or
- configuring at least one resource of the multicast group (receiving resources) to decide not to respond to the initial message in the event that it is busy or cannot perform or fulfil the one or more tasks or processing requests related to the initial message based on certain criteria; and/or configuring the at least one resource of the multicast group (receiving resources) to decide not to respond to the initial message in the event that it is not willing to perform or fulfil the one or more tasks or processing request related to the initial message based on other criteria.

In embodiments, the first group of resources and/or the second group of can include resources that validate one or more blockchain transactions, miner pools or a set of proof-of-work calculating resources, resources that create a block of transactions using proof-o-work or proof-of-stake consensus, or resources which process data in some way for blockchain and/or cryptocurrency-related purposes.

In embodiments, the one or more tasks or processing requests can relate to blockchain transactions blockchain transactions or other blockchain data.

In embodiments, the one or more tasks or processing requests can relate to:

- validating one or more blockchain transactions,
- mining a block of transactions using proof-of-work calculating resources or calculations for other consensus mechanisms such as Proof-of-stake,
- creating a block of transactions using a Proof-of-Stake or Proof-of-Work consensus mechanism,
- processing or distributing data to one or more receivers such as nodes in a network; the data could be an alert, executable code; software updates or installations; documents or files; or another type of communication/data;
- simplified payment verification, or
- processing data in some way for blockchain and/or cryptocurrency-related purposes.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF ILLUSTRATIVE EMBODIMENTS OF THE DISCLOSURE

Figure 5:
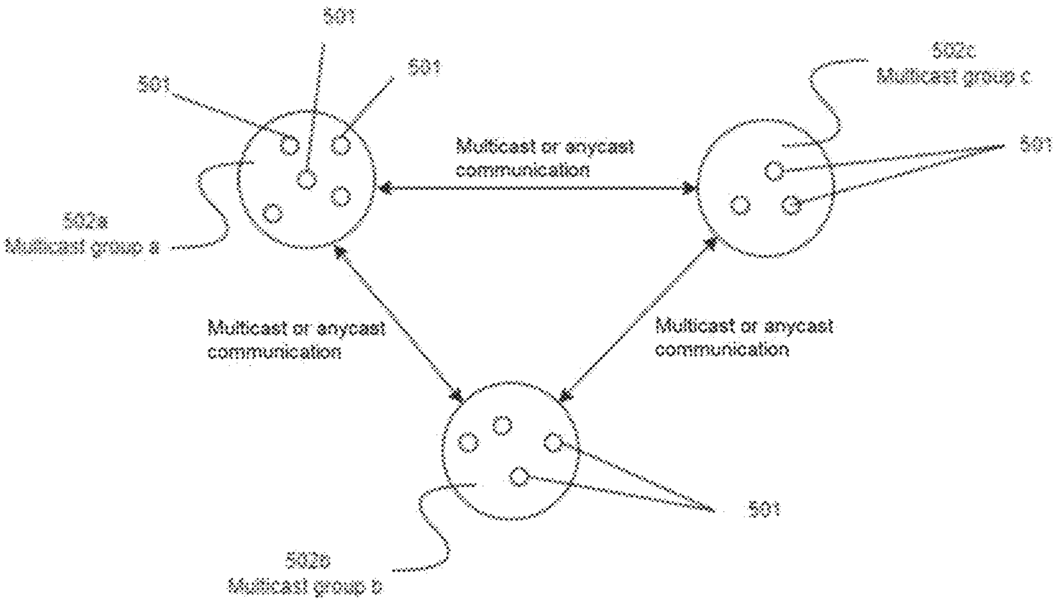
FIG. 5 shows an embodiment of the invention, in which resources belonging to multicast groups communicate with one another for the secure, efficient and speedy distribution of electronic data.

FIG. 5 illustrates an embodiment in which network resources belonging to multicast groups communicate with one another for the secure, efficient, and speedy distribution of electronic data. In this illustrative embodiment, three groups of network resources 501 are shown. Multicast group "a" 502*a* contains five resources 501, multicast group "b" 502*b* contains four resources, and multicast group "c" 502*c* contains three resources. It should be understood that the number of resources 501 in each multicast group has no bearing on the invention. For instance, a first group may have ten resources 501, a second group one resource 501, and a third group a hundred resources 501. A multicast group 502 is a group of resources addressable via a single multicast address, as explained herein. A resource 501 that sends any type of data to another resource may be referred to herein as a sending resource, and a recipient of the data may be referred to as a receiving resource.

FIG. 5 illustrates each of the three multicast groups of resources communicating with one another. A communication may comprise sending one or more packets of data in a transmission. The data may be blockchain-related data but not necessarily so. The transmission may comprise data relating to a request for data from one or more recipients. Alternatively, the transmission may simply provide data to the recipients and may not comprise a request for a response. The disclosure is not limited with regard to the nature, form or type of actions performed by the recipient(s) upon receipt of the data from the sending resource. The transmission may be performed using multicast and/or anycast.

When using multicast transmission, a resource of a multicast group, for example group 502*a*, may send data to the same group 502*a*, and/or another multicast group e.g., 502*b*, in the form of a single transmission to a single multicast address corresponding to or associated with multicast group 502*a*/502*b*. In this way, only one transmission is sent and only (but all) resources that are members of the receiving multicast group receive the data.

When using anycast transmission, a sending resource, for example a resource of group 502*a*, may transmit data by sending it in the form of a single transmission to an anycast address corresponding to a group of resources (e.g., group 502*a* or group 502*b*). The data packet(s) are routed to the resource of the group associated with the anycast address that is determined to be the topologically closest to the sending resource. The receiving resource may process the data or forward the data to one or more of the other resources (for example, the resources of multicast group 502*a* or to any other resource(s) in one or more of the other groups, or even to any other resource that is not part of any group). In this way, only one data transmission is sent to a single receiving resource within a particular anycast transmission, and then that data can be disseminated across other members of a multicast group via a multicast transmission. This is advantageous in situations where only one or a subset of the multicast group needs to receive the transmission in order to provide the data to the entire group. Similarly, a resource of a multicast group may send or receive data using multicast or anycast.

When using multicast transmission, a resource of a multicast group, for example group 502*b*, may send data, such as requested data in response to such a request, by sending the data to multicast group 502*a* in the form of a singular data transmission to a single multicast address corresponding to multicast group 502*a*. In this way, only one data transmission instance is required and all of the member resources of multicast group 502*a* receive the data. In this embodiment, the sending resource may be referred to as a "sending resource" and the member resources of multicast group 502*a* as "receiving resources".

When using anycast transmission, a resource of a multicast group, for example group 502*b*, may send data, such as requested data in response to a received request, by sending the data to group 502*a* in the form of a singular data transmission to a single anycast address corresponding to group 502*a*. The data is routed to a resource of group 502*a* determined to be topologically closest to the resource that sent the data. The receiving resource may then forward the data to the other resources of group 502*a* using multicast transmission. In this way, only one data transmission instance is required to have the data arrive at group 502*a*, only the member resources of group 502*a* receive the data, and the possibility that only a subset of the group 502*a* needs the data is addressed. Additionally or alternatively, the receiving resource may forward the data to another resource using unicast (direct) communication.

By way of technical background, and with particular reference to FIGS. 6 to 9, we provide an explanation of some transmission protocols and techniques that can be used in combination with the disclosure to provide the technical effects and benefits of the various embodiments.

As known in the prior art, Internet Protocol (IP) is the communications protocol that provides an identification and location system for computers on networks and routes data packets across the Internet. Resources (i.e., devices/systems) on the Internet are assigned a unique IP address for identification and location definition. IPv6 was designed with a view to providing a solution to the IP address deficiencies arising from IPv4.

Figure 6A:
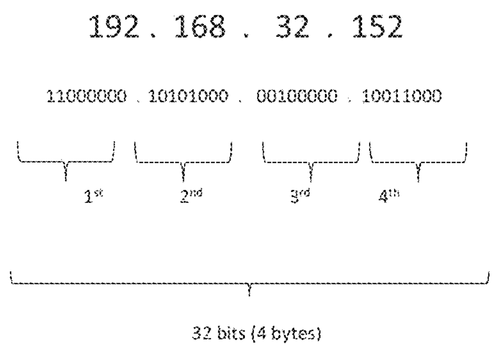
FIG. 6*a* shows example of an IPv4 address in dot-decimal notation.

IPv6 Addresses:

An example of an IPv4 address in dot-decimal notation is shown in FIG. 6*a*. It is composed of four 8-bit sections, each separated by dots and referred to as an octet.

Figure 6B:
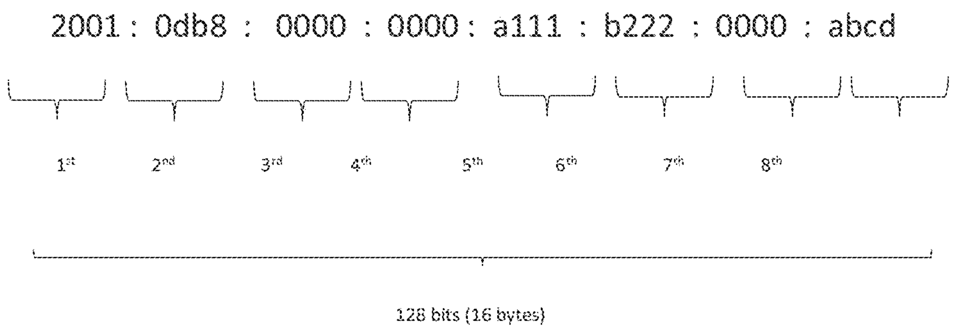
FIG. 6*b* shows an example of an IPv6 address in hexadecimal notation.

For the purpose of comparison, an example of an IPv6 address is shown in FIG. 6*b* in hexadecimal notation, wherein each hexadecimal character represents a series of 4 bits. The address is composed of eight 8-bit sections, each separated by colons. Each 8-bit section is referred to as a hextet. This address can be simplified using a variety of rules, including i) replacing multiple consecutive all-zero hextets with a double colon (only once), and ii) removing any leading zeros for hextets; this produces:

2001:db8::a111:b222:0:abcd

Figure 6C:
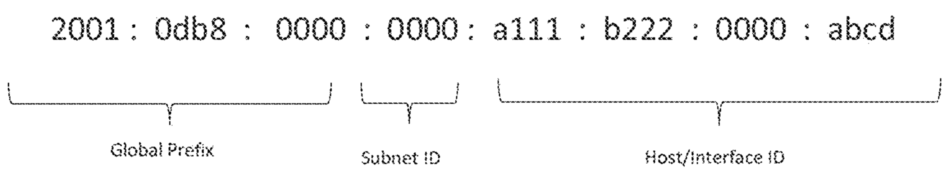
FIG. 6*c* shows how address prefixes can be reserved for representing IPv6 address types.

Given the difference in the address formats, IPv6 allows for a greater quantity of addresses compared to IPv4. In turn, this provides the ability to reserve address subspaces for different address types. Address prefixes are reserved for representing various address types as illustrated in FIG. 6*c*, in which the global prefix is the block of IP addresses provided to an end user by their Internet Services Provider (ISP). At minimum, it is 88 bits long, with the Subnet ID comprising 16 bits and the host/Interface ID comprising 64-bits.

These address types typically represent different methods of casting information within the network, including those shown in the Table below:

TABLE 1

| Type of address | Prefix | Info |
|---|---|---|
| Global Unicast | 2000::/3 | Publicly routable |
| Unique Local | FC00::/7 | Routable in LAN |
| Link local | FE80/10 | Not routable |
| Multicast | FF00::/8 | Addresses for groups |
| Anycast | 2000::/3 | Shared address |

Multicast:

Multicast is a one-to-many network communication solution where a sending resource transmits a single data packet addressed to a multicast address corresponding to a multicast group with multiple resources/destinations. The sending resource only sends one copy of the data to the multicast address. Resources that have subscribed to the multicast group will receive a copy of the data after it is replicated at the applicable junction in the network. Multicast transmissions are especially efficient with respect to bandwidth consumption as the sending resource only sends one copy of the data even though all members of the multicast group receive a copy. This is in contrast to unicasting where the sending resource establishes a connection with each intended recipient and sends each a separate copy of the data.

As shown in FIG. 6*c*, subspaces of IPv6 addresses can be designated for use with different types of addresses (unicast, multicast, etc.). The address shown in FIG. 6*c* (2001:0db8::a111:b222:0:abcd) is an example of such an address. For a unicast transmission, the data packets are sent from one global unicast address to another. There are different types of IPv6 unicast addresses. A global unicast address is a routable unicast address. (This is similar in usage to that of a public IPv4 address)—see, for example, www.ciscopress.com/articles/article.asp?p=2803866&seqNum=4.

Figure 7:
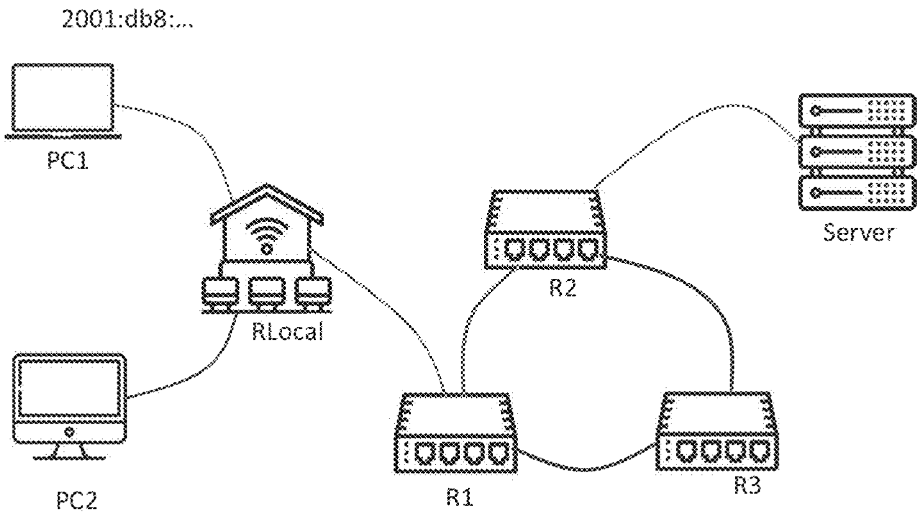
FIG. 7 shows a unicast transmission of a data packet from a server's address to the global unicast address of a computer (shown as PC1).

With reference to FIG. 7, unicast communication of a data packet from the server's address to the global unicast address of PC1 would result in the data packet being routed through the Internet and arriving at PC1 with address 2001:db8::a111:b222:0:abcd. PC1 would be the only resource that processes the data packet.

For multicast transmission, as opposed to sending the data packet to an address of PC1, the data packet is sent to a multicast address. This would be to an IPv6 address with the prefix FF. Resources that would like to receive the data from the server join the multicast group of that multicast address. This is called their "subscription."

Figure 8:
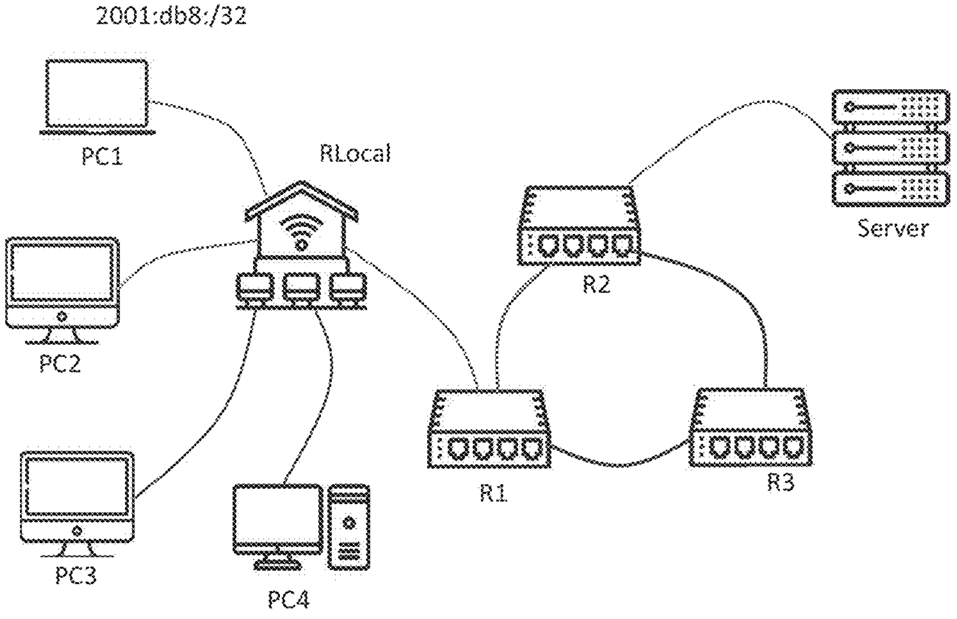
FIG. 8 shows a multicast transmission, for comparison with the unicast transmission of FIG. 7; here, the data packet sent from the server is routed through the internet to the multicast address for retrieval by subscribers.

When the data packet is sent from the server it is routed through the Internet to the multicast address (e.g., 'RLocal' in FIG. 8, which shows a multicast transmission from a Server to subscribers PC1 and PC2). On the packet's arrival, the subscribers e.g., PC1 and PC2, are able to retrieve the data, whereas non-subscribers PC3 and PC4 will ignore the data packet. This multicast transmission reduces the need to send two separate data packets from the server to PC1 and PC2. Only on arrival at RLocal are separate copies of the data packet created. For the multicast packet to have arrived at PC1, the resource PC1 would have to make a report to RLocal that they would like to join the multicast group FF00:/8. When RLocal sees this report, it will open an interface to PC1 with the promise of forwarding any multicasting messages to PC1 if it sees any of the multicast packets on the network. A router in the network (e.g., R2) would have been selected as the Rendezvous Point (RP) for the multicast to FF00:/8. Knowing that the best path to R2 runs through R1, RLocal will send a join report to R1 asking R1 to forward the request for the FF00:/8 multicast transactions to the Rendezvous Point R2. R1 will send a join report to R2. If the Rendezvous Point is to receive a multicast packet it will forward this packet to R1 which then passes it on to RLocal, which then in turn passes it on to PC1.

Anycast

IPv6 anycast transmission can be used in a network in which multiple resources/destinations share a common IPv6 anycast address. An anycast address, as shown in Table 1 above, shares the same prefix as global unicast address. For example:

2001:db8::a111:b222:0:abcd can also be used as an anycast address.

If a data packet is sent by a sending resource to an anycast address, it is forwarded to the topologically closest or nearest resource of the set of resources corresponding to the anycast address. While geographical distance is a factor in determining the topologically closest resource, there are other influencing factors in the calculation such as: number of hops, efficiency, latency and cost. In the end, for anycast transmission, only one resource is expected to receive the data packet and is often described as a one-to-nearest transmission.

Figure 9:
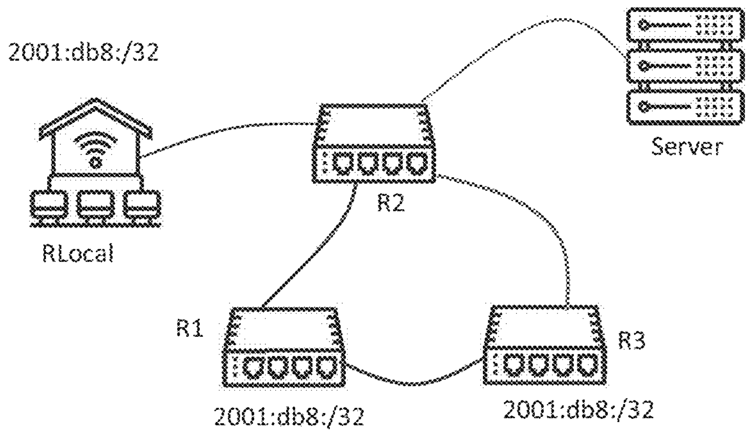
FIG. 9 shows an anycast transmission, for comparison with FIGS. 7 and 8, in which the server sends a data packet to an anycast address; the data packet is forwarded to the topologically nearest resource (i.e., router/node) of a subscribed set of resources.

With reference to FIG. 9, which shows anycast transmission from a Server to Router R3, it can be seen that the packet is sent to the anycast address, 2001:db8:/32, which shared by at least three routers (R1, R3, RLocal). The closest of these is R3 so the data packet is sent to R3. Recall that 'closet' does not necessarily refer to geographical proximity.

ILLUSTRATIVE EMBODIMENTS

Turning now to a discussion of illustrative embodiments of the disclosure, and with reference to FIGS. 5 to 19, a solution is provided that utilises these transmission techniques for fast, secure and scalable distribution of data across a network. In our preferred embodiment, the data is communicated across a network, e.g., the Internet, from one or more sending resources to one or a plurality of receiving resources. In some scenarios, the receiving resources are organised in logical groups and each group can comprise one or more resources. The resources can comprise any type of computing resource, controlled by or belonging to any organisation(s), and arranged for use for any suitable purpose. Each resource may comprise one or more hardware and/or software components, and arranged for communication with other resources over an electronic network. In some cases, a resource may be a mining node on a blockchain network, while in other cases it may be a digital wallet, a cryptocurrency exchange, or a search engine, or a file server, or a service provider etc. There is no limitation on the type, form, purpose or configuration of the resource(s).

Each group is associated with a respective group identifier that serves as a unique address to which data can be sent.

For multicast transmission, the group is a multicast group and all resources in the multicast group are associated with the multicast address of the group and, therefore, can receive data that is sent from a sender to that multicast group address. The multicast address may be an IPv6 multicast address or an IPv4 multicast address. The multicast address can be used to implement 1-to-many communications in that a sending resource need only send a packet of data once to the multicast address in order for each resource in the multicast group to receive it, rather than sending it to each and every resource in a 1-to-1 communication (such as performed in a unicast transmission).

Receiving resources may subscribe to, i.e., join, a multicast group by sending a Multicast Listener Discovery (MLD) message which signals its intention to participate. Advantageously, a joining resource can be located on a local network (LAN) or on the internet, as multicast groups are not constrained by local or global network geography. The resource can receive multicast packets sent to that multicast address of the multicast group as long as it is signalling its membership of the multicast group. Therefore, resources can join or leave a multicast group dynamically, at any time, by simply signalling to the network to join, or ceasing to signal to the network for that multicast group.

Therefore, a multicast group is used to identify a group or resources, each of whom has an interest in, or need for, the particular data transmissions that are sent to that multicast address of the multicast group. While only resources that belong to a given multicast group can be receivers, the data can be sent to the multicast group by any resource irrespective of whether it is part of the multicast group or not. Resources in one multicast group can send to another multicast group and vice versa.

For anycast transmission, the group is an anycast group associated with the anycast address for the group. The anycast address is a logical, collective identifier for the network resources in the anycast group so that one resource of the anycast group (which is typically the resource topologically closest or nearest to the sending resource) will receive data packets sent from a sending resource to the anycast address via anycast transmission. In some embodiments, the anycast address can be an IPv6 anycast address, and the data is sent and received over the Internet. The anycast group address can be used to efficiently implement 1-to-closest-of-many communication.

Multicast Listener Discovery (MLD) and MLD Snooping

As known in the art, MLD is built into the IPv6 protocol. See, for example, en.wikipedia.org/wiki/Multicast_Listener_Discovery. MLD snooping uses MLD to provide numerous efficiencies because it avoids flooding packets across networks and thus transmission of data to network resources that have not signalled an interest in receiving that data. In addition, it provides improved network security because it avoids Denial of Service (DOS) attacks from unknown network sources.

By default, MLD snooping is disabled. As a result, when a switch receives a packet that has a multicast address it is sent to all interface ports in its VLAN except the port that the packet was received on. In other words, the switch floods the packet across the VLAN. If a resource is not a member of the multicast group and not interested in the data on that channel, it ignores the packet. Clearly, this gives rise to unnecessary network traffic and inefficient use of energy and processing resources.

However, when MLD snooping is enabled, the switch forwards the multicast-addressed packet only to interface ports that that have signalled an interest in receiving packets destined for that address. In other words, it only sends the packet to ports belonging to members that have subscribed to that multicast group. Thus, MLD snooping allows a sending resource to selectively transmit data packets to resources which have indicated an interest in receiving them. If no network resources are subscribed to the multicast group, the sending resource does not send any packets. Further details can be found at: techhub.hpe.com/eginfolib/networking/docs/switches/WB/15-18/5998-8170_wb_2920_ipv6_config_guide/content/v33585413.html.

Distribution of Blockchain-Related Data:

In one particularly advantageous scenario, the sending and/or receiving resources are computing resources which are operative to send, receive, store and/or process blockchain-related data. In one example, these resources could be nodes in a blockchain network that implement a particular blockchain protocol (e.g., Bitcoin SV protocol). A multicast group may be created comprising all nodes in the blockchain network, or a subset of the nodes. For example, the multicast group may be set up to share data between a pool of miners, or a set of PoW calculating resources, or any other type of operation. In other examples, though, one, some or none of the resources may be nodes on a blockchain network but may be resources which process data in some way for blockchain and/or cryptocurrency-related purposes. These could include, for example, providers of digital wallets, cryptocurrency exchanges, banks and financial institutions, distributed verification providers, mining pools, service providers that provide supporting functionalities for cryptocurrency or blockchain-related organisations etc.

The efficiencies of IPv6 are considered as advantageous to blockchain networks such as Bitcoin because 1) Bitcoin is itself maintained by a network of distributed nodes; and 2) these nodes communicate peer-to-peer over the Internet.

Figure 10:
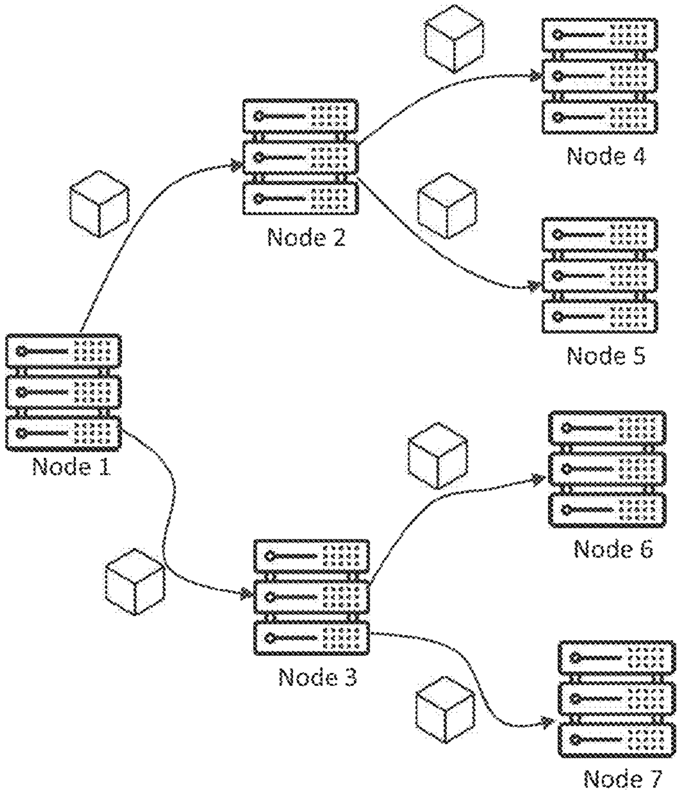
FIG. 10 shows block propagation in the Bitcoin network.

For the Bitcoin network, each full node 104 is expected to store up-to-date copies of the blockchain/ledger, the mempool (dataset of unconfirmed transactions) and the UTXO set (list of all unsent transaction outputs). To maintain the most current versions of those datasets requires continuous communication between the nodes, where validated transactions and blocks are shared between them. A block contains a set of transactions as well as the block header. The block header itself contains the nonce used to mine the block, as well as the Merkle root that represents the set of transactions in the block. Embodiments may be used to advantage in respect of:

Transaction Propagation:

When a wallet submits a transaction to the Bitcoin network (e.g., a user purchases an item in store with Bitcoin), a full node 104 that receives the transaction checks whether the transaction is valid (content satisfies all the rules of the version of the Bitcoin protocol of the node's software) and whether the transaction is not a double-spend of a transaction already in the mempool. (A "double spend" occurs when two spending transactions attempt to spend the same output of a given funding transaction on the blockchain). If both criteria are satisfied, the Bitcoin node updates its personal mempool, and sends the validated transaction to a set of other Bitcoin nodes to which it connects. Each of these receiving nodes go on to perform the same validity checks, update, and transaction transmission steps. This allows for the propagation of transactions across the Bitcoin network Block Propagation:

We refer to FIG. 10 which illustrates a block propagation between nodes in a blockchain, e.g. Bitcoin network. When a node mines a new block from a pool of transactions in its mempool, it updates its data stores (UTXO set, mempool, blockchain) and relays the new block to its connected nodes. For the Bitcoin protocol nodes can have at most 125 connections, only 8 of these being outgoing connections.

These connected nodes, in turn, perform their own validity checks on the block, update their datastores, and relay the blocks onwards. This allows for the propagation of blocks across the Bitcoin network.

The speed of transaction and block propagation is particularly important as a node and/or wallet would requires the most current version of their datasets (UTXO set, mempool, blockchain) in order to minimise the risk of double spending. It is also in the best interest of full, mining nodes 104 to be aware of the most recent block mined, at the earliest time. This is to reduce their time spent generating a Proof Work (PoW) for a pool of transactions where some or all of these transactions have already been included in a mined block.

For the BTC network, newly mined blocks take an average of 10s to propagate through the network. This propagation time is proportional to the size of the block (1 MB max for the BTC network). On the other hand, nodes that implement the Bitcoin SV protocol, which allows large block sizes, need inventive solutions for reducing the time to propagate their large blocks. Therefore, faster block propagation is crucial for scalability.

Block Header Propagation

Given that nodes receive transactions from multiple sources, and their mempools are likely to share transactions, it may be inefficient to send the entirety of a newly mined block to the at least 8 outgoing connections, as the receiving nodes are likely to already have copies of many of the transactions in the mined block in their mempool.

To address this, rather than sending the newly mined block to an outpoint node, the sending node can send a copy of the block header along with a list of transaction IDs (hash of the transaction) contained in the block. In some embodiments this may be an ordered list depending on the blockchain protocol that is being used. This (ordered) list, along with the Merkle root and nonce of the header, can prove the validity of the mined block. The receiving node can use the ordered list to determine which, if any, transactions it does not already possess in its mempool. It can then send a request to the sending node for copies of the outstanding transactions. Upon receipt of the request, these are sent by the sending node to the requesting node. The requesting node then composes or compiles the block based on the transactions and header information it has received from the sending node, and then adds the new block to their copy of the blockchain.

Figure 11:
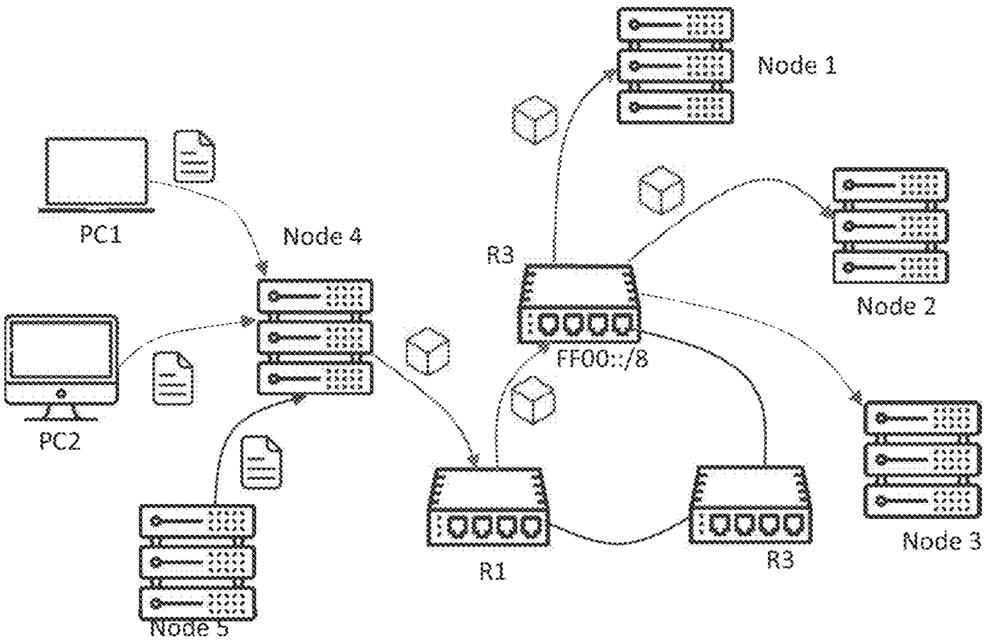
FIG. 11 shows an example embodiment of the disclosure, in which a node in a blockchain network performs a multicast transmission of one or more mined blocks.

Data Distribution Using Ipv6 Multicast Transmission:

In accordance with some embodiments, IPv6 communication of data packets can be employed to advantage in respect of block distribution across or within a blockchain network. FIG. 11 shows an example of distribution of mined blocks from Node 5 to a network of nodes using multicast transmission. Nodes in the blockchain network (or a subset of the network) that wish to receive block updates, based on specific criteria, may elect to subscribe to a shared multicast address. One or more sending (source) nodes may send applicable blocks to the multicast address. These may be full blocks or partial blocks, and may be mined or pre-mined blocks.

In the example of FIG. 11, blockchain node 4 receives Bitcoin transactions from PC1, PC2 and Node 5 and was able to successfully produce a mined block, which it seeks to distribute as efficiently as possible to a set of interested nodes. In the example these interested nodes would be Node 1 and Node 2. Both nodes have subscribed to the multicast address 2001:db8:/32. Node 4 sends one copy of the block to the multicast address. On arrival at this address, the block is replicated, and a copy sent to the subscriber nodes Node 1 and Node 2.

As mentioned above in respect of block header propagation, sending a complete block to a recipient may mean that the node receives copies of transactions that it already possesses. This may give rise to inefficiencies if the required data, or at least part of it, can be accessed locally rather than needing to be sent across a network.

With this in mind, variations of the following process may be performed:

rather than sending an entire block via multicast, the sending node may instead send, via IPv6 multicast, only the block header and the (ordered) list of transactions to the multicast address; therefore, all subscribed nodes will receive this information via the multicast transmission;

each receiving (i.e. subscribed) node uses the received information to determine which, if any, outstanding transactions they need in order to generate the complete block if a receiving node determines that at least one transaction is needed for it to generate the block, that node sends a request to the sending node (via a unicast transmission) for the required i.e. missing transactions; the request comprises the IDs of their missing transactions;

the sending node receives the request from the receiving node;

the sending node sends a transmission comprising the requested, missing transactions to the receiving node. Preferably, this would be a unicast transmission to only the individual receiving node that has sent the request. This is because the sets of outstanding nodes for the respective receiving nodes are likely to be unique, lessening the value or benefit of sending the outstanding transactions to the whole subscribing group via IPv6 multicast.

MLD Snooping As mentioned above, MLD snooping can provide significant efficiencies and benefits for the transmission of data across networks. In respect of blockchain related services or functionalities, this can greatly improve blockchain implemented applications and service providers, as well as enhancing the networks which implement the underlying blockchain protocol itself.

Using IPv6 multicast transmission, a sending resource has the ability to enable MLD snooping. This enables the sending resource to transmit packets selectively to only those resources which have indicated a desire to receive them. This means that transmission of blockchain-related or relevant data can be effectively targeted to specific destinations. This effectively changes the flow of information from being a push pattern to a subscription/publication pattern; i.e., receiving hosts subscribe to an IPv6 Multicast group and packets are then forwarded from the switches running MLD Snooping (layer 2) to the routers running MLD (layer 3) to the receiving hosts. As a result, only necessary traffic is forwarded through the network. This addresses, at least in part, the widely recognised technical challenge of how to achieve scalability within blockchain networks which requires extremely high volumes of transactions per second to be sent. Thus, blockchain-related methods and systems which incorporate the use of MLD snooping facilitate or enable the construction of improved blockchain networks and blockchain-implemented applications.

By way of example, consider an IPv6 Multicast group of 2 members, Alice and Bob, who wish to participate in an SPV verification. Suppose that one of them is a merchant and the other is a customer wishing to purchase goods or services from the merchant using Bitcoin. The use of MLD & MLD Snooping greatly improves the SPV transaction by allowing both Alice & Bob to receive a Merkle Path as a response to a submission to nodes on the Bitcoin network. In some embodiments, certain nodes on the blockchain network may provide this functionality as a subscription-based service. In other examples, applications and services may subscribe to Multicast group addresses to receive submitted blockchain transactions upstream from the blockchain nodes themselves. This is possible because the transactions are public. This improved data flow enables blockchain transactions to be verified via Merkle Proofs using their Merkle Paths, rather scanning or iterating over a blockchain ledger. Again, this provides a more efficient solution for the construction of blockchain related applications which need to interact with, use or interrogate blockchain-related data. Advantageously, some embodiments of the present disclosure provide solutions for implementing a mempool or a UTXO set for a blockchain network. According to such embodiments, nodes on the network may be blockchain nodes, and may join a multicast group as described herein. The nodes may be full blockchain nodes 104. The nodes may transmit blockchain related data between the group members by way of an IPv6 multicast message. The blockchain related data may be or comprise at least one unconfirmed blockchain transaction or at least one unspent transaction output (UTXO). Although International patent application WO2018/234987 discloses the use of multicast for propagation of initial transactions through an overlay network of specialised nodes that sits on top of a blockchain network, it does not disclose the use of IPv6 multicast for use with (full) nodes on a blockchain network itself. Moreover, it does not disclose the use of multicast for propagation of unconfirmed transactions such as required for the implementation of a mempool. In fact, the Bitcoin network still does not use IPv6 for inter-node communication, and WO2018/234987 actively discloses the use of a DHT instead of multicast because it suggests that the network lacks the ability to scale sufficiently to cope with the increased transaction output that Multicast distribution would bring with it.

Data Distribution Using Ipv6 Anycast Transmission:

Anycast transmission is particularly applicable for instances where speed of transmission is of particular concern. With respect to block propagation in a blockchain network, nodes desire receiving a copy of a newly mined block as soon as possible. As nodes obtain a copy of a newly mined block, they may choose to join an anycast group associated with an anycast address. This essentially means assigning themselves (i.e., a network interface) to an anycast address. The anycast address is, essentially, a shared unicast address. An interested node can then send a request transmission to the anycast address indicating that that they are seeking a copy of the newly mined block and/or requesting a copy of the newly mined block. The request transmission will arrive at the topologically closest node that belongs to the anycast group associated with the anycast address. This nearest node will then send a copy of the mined block directly (using unicast) to the node that requested it.

Figure 12:
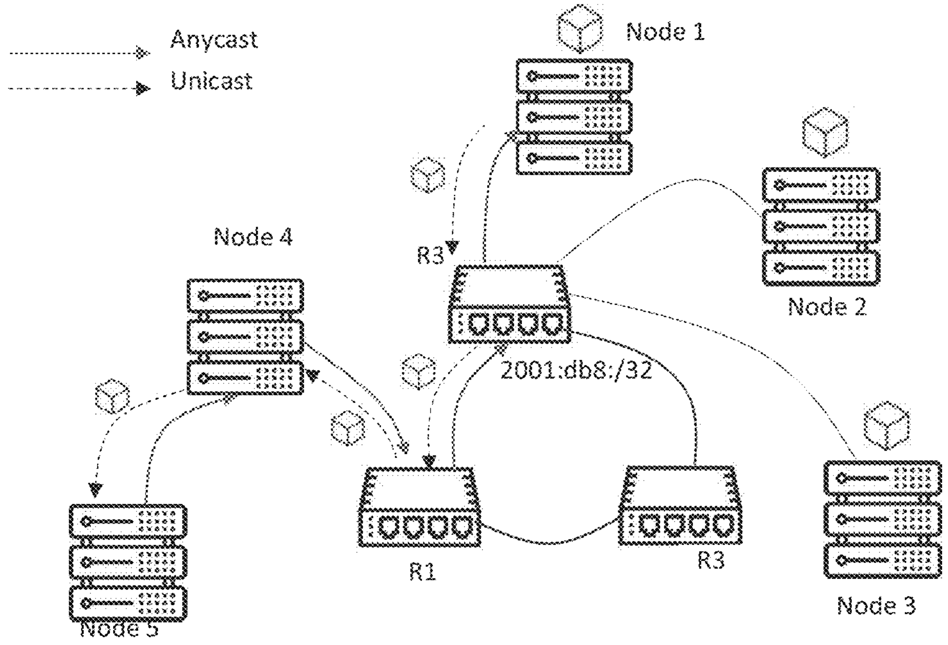
FIG. 12 shows an example embodiment of the disclosure, in which a node in a blockchain network performs an anycast transmission to an anycast address.

FIG. 12 shows an example of an anycast transmission from Node 5 to anycast address 2001:db8:/32. Nodes 1, 2, and 3 have obtained copies of the newly mined block. On receiving and validating a copy of the mined block, they each assign themselves to the anycast address 2001:db8:/32. It is a shared understanding that this anycast address means that this address represents that the recipient is in possession a copy of a newly mined block. Node 5 sends a request for a copy of the block to the anycast address; the node (of nodes 1, 2, and 3) that is the nearest topologically closest will be the node that receives the request.

In the case of FIG. 12, the closest is Node 1. Said node 1 will then, if it chooses, send a copy of the block to Node 5 via unicast communication. Given the node that is in closest proximity is chosen, this means that Node 1 is likely to more quickly receive a complete copy of the block.

Note however that 'closest' node can be dependent on several factors other than geographical proximity; for example, latency and costs can be used as factors in its determination. If the channel to Node 1 becomes overwhelmed with block transmission and block-requests, the calculation of 'closest' will possibly select another node as the new nearest node. This distributes the requests and block transmissions across the nodes in possession of a new block.

In the case of block header transmission, the process may still operate as described above. In a preferred embodiment, the request for the block header of a newly mined block will be performed through the anycast request. When the nearest node is determined, a unicast transmission will be sent from the requesting node (Node 5) asking for the outstanding transactions from the nearest node (Node 1). Recall that the outstanding transactions are the transactions in the newly mined block that are not in the mempool of the requesting node. These outstanding transactions will be sent to the requesting node (Node 5).

Data Distribution Using Multicast with Anycast and/or Unicast

Figure 13:
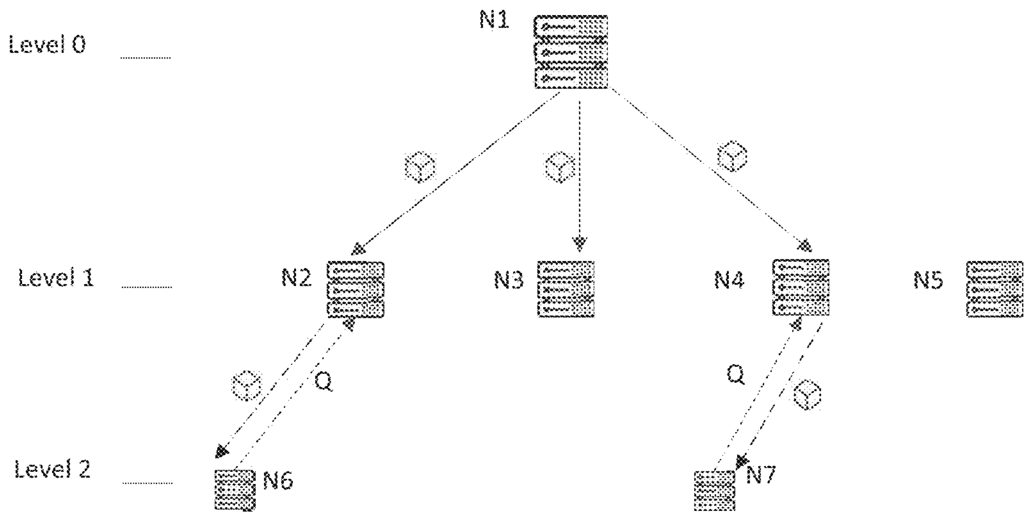
FIG. 13 shows an example embodiment of the disclosure, in which the use of multicast and anycast transmissions are combined for the purpose of block distribution.

FIG. 13 provides an illustration of the use of multicast transmission with anycast transmission for block distribution. In such an embodiment, the previously described uses of multicast transmission and anycast transmission are combined to provide a solution in which blocks are sent from a source node (N1 in layer 0 of FIG. 13) to multicast-subscribed nodes (N2 . . . N4, layer 1). Other interested nodes (N6, N7 in layer 2) determine, via an anycast query transmission, which members of the multicast group (layer 1) is their closest peer. These layer 2 nodes then proceed to download the blocks from the nearest layer 1 node.

For FIG. 13, the node N1 is the first to mine a block and multicasts this block to a set of subscribers N2, N3, and N4. N5 is not a subscriber. Each of these nodes is expected to also assign themselves an anycast address (shared unicast address). Nodes that share this address are expected to be nodes with a newly mined block. Nodes N1 and N7 are interested in this new block and send a request (Q) to the anycast address shared by N2, N3, and N4. The request is routed to the nearest node. For N6, the nearest node is N2. N2 receives the request for the blocks and sends this block to N6. For N7's request, this arrives at N4 (nearest node). N4 sends the block to N7 via a unicast transmission.

This can be implemented using a fixed anycast address as follows. It should be noted that this is provided for illustration only, and some of the following steps may be omitted and the order in which they are provided below is not intended to be limiting, as some steps may be performed in a different order from that shown below; the following list of steps is not intended to be exhaustive:

1. A set of associated (e.g., key stakeholder) nodes come to an agreement on their shared obligation, responsibility or goal (e.g., to distribute large blocks, or blocks in accordance with a particular protocol, or in accordance with the terms of an agreement).
2. These associated nodes subscribe to a shared multicast address. The multicast address may be determined by one or more of the nodes, or may be determined by an address determining party which sends the multicast address to the associated nodes. Upon subscribing to the address, these nodes are now group members of the multicast i.e., they listen to the multicast address.
3. The associated nodes promote/advertise their service to a wider network e.g. the Bitcoin network, or at least their local or designated communities or associations in the network
4. At least one of the associated nodes, or another party, promotes the shared multicast address to the wider (Bitcoin) network or at least their respective local or designated communities. Nodes that mine a new block are asked to send their new block (or block header and ordered list of transactions) to this multicast address.
5. At least one of the associated nodes or another party communicates a unique anycast address to the wider Bitcoin network or at least their respective local or designated communities.
6. A node (which may be an associated node or a non-associated node) mines a new block.
7. The mining node i.e. the node that has mined the new block sends the new block (or the block header and list of transactions) to the multicast address.
8. The block (or block header and transactions) is routed via IPv6 to all members of the multicast group; in other words, the data is sent via a multicast transmission to the multicast address
9. At least one, but preferably all, of the associated nodes performs the necessary check to validate the legitimacy of the newly mined block
10. If a block header and list of transactions has been sent rather than a full block:
    a. the associated node compares the transactions in ordered list against the transactions that it has in its mempool. If it is unable to match at least one transaction in the list with a transaction in its mempool, the associated node sends a unicast request to the mining node asking for the outstanding transaction(s).
    b. The mining node sends the missing transaction(s) to the key node via a unicast transmission.

In cases where anycast transmission is used:

1. Non-associated nodes may intermittently send requests to the anycast address of the multicast group. The request message may include the unicast address of the sending node.
2. If an associated node (i.e. receiving multicast group member) with an anycast address receives a request for a copy of the new block, the associated node then sends a copy of the block (or block header and transaction list) to the requesting node via unicast (Receiving a request via anycast means that the group member is the nearest in the group to the request-sending node).
3. If block header and ordered list is sent to a non-associated node:
    a. the node checks its mempool for the transactions in ordered list i.e. as above, it inspects its mempool and checks to see if each transaction in the list is in its mempool; if any transactions in the list are absent from the mempool, the node sends a unicast request to the associated node asking for the outstanding (absent) transaction(s)
    b. The associated node sends the missing transaction(s) via a unicast transmission to the node.

After a certain amount of time has passed or criteria has been met (e.g., the block was sent to at least 25 nodes by the associated node), the associated node may de-assign itself from the anycast address. The associated node focuses on listening for new blocks at the multicast address.

It should be noted that:

- a node can be listening for new blocks at the multicast address simultaneously while it is receiving block requests and disseminating new blocks.
- a node can subscribe to multiple multicast addresses, i.e., it can be listening on the Bitcoin network for multiple, different types of blocks.
- a node can remove itself from a multicast group or anycast address by its own choosing.

Given the limitation typically found in Bitcoin network implementations on the number of outbound nodes (8 for BSV), a node seeking fast propagation of its newly mined block may find value in careful consideration of what the at most 8 nodes it connects to should be. As an example, the 8 nodes could be strategically chosen based on their geographical location, in that each may be a high capacity node, centralised within their geographical region. ('High capacity' includes factors such as bandwidth, low latency, computational power, storage). These nodes 8 nodes join a multicast for new block propagation. i.e., listen to a shared multicast address. Any node that mines a block would see fit to perform a multicast to this set of 8 centralised nodes who would then, in turn, communicate the block to other nodes in their respective geographical regions.

Figure 14:
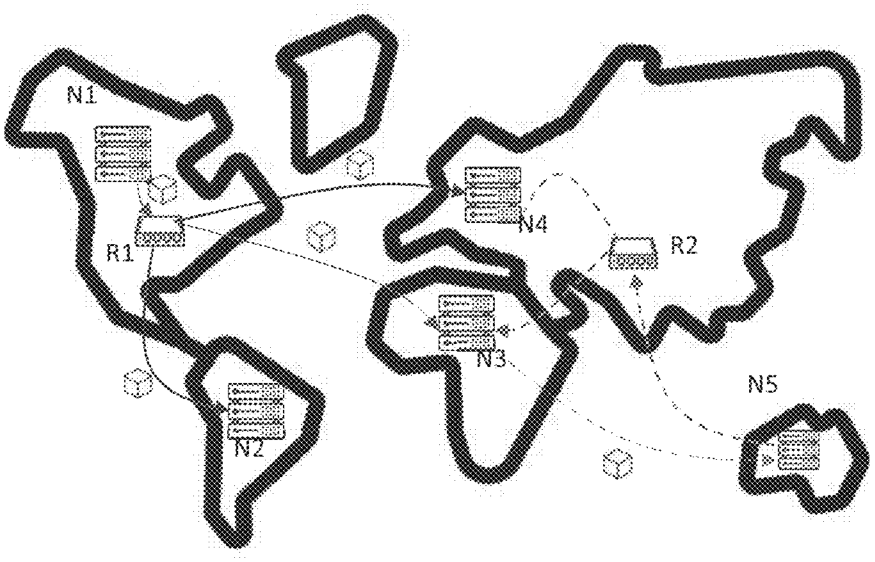
FIG. 14 provides an illustration of an advantageous use of multicasting of blocks in accordance with an embodiment of the disclosure, including a consideration of geographical factors for enhancing distribution speed and efficiency.

Consider FIG. 14, which provides an example of blockchain-related data distribution using multicast transmission of block-related data and anycast transmission based on geographical location. A block mined by node N1 in Canada is sent via multicast to key central nodes in Brazil (N2), Germany (N4) and Nigeria (N3). A node (N5) in Australia sends a request to the shared anycast address of N2, N3, and N4 for the new block. The request arrives at N3 in Nigeria (determined as nearest) who then sends the new block to node N5 in Australia.

Figure 15:
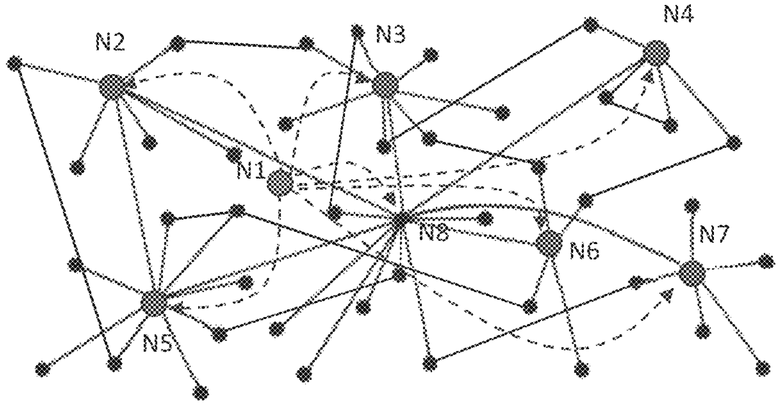
FIG. 15 shows a node on a blockchain network broadcasting a block via multicast transmission to key nodes in the blockchain network.

Note that the centralisation of key nodes within the Bitcoin network may not map directly to geographical locations. These nodes may be 'topologically centralised' or have a high degree of centrality in emergent clusters/communities in the network. As an example, Tao et al. [Tao, B., Dai, H. N., Wu, J., Ho, I. W. H., Zheng, Z. and Cheang, C. F., 2021. Complex network analysis of the bitcoin transaction network. *IEEE Transactions on Circuits and Systems II: Express Briefs,* 69(3), pp. 1009-1013] show the presence of communities within the Bitcoin Core network. The network in FIG. 15 shows the node N1 broadcasting a block via multicast to key 'central' nodes (N2 . . . N8) in the Bitcoin network. These receiving nodes can then distribute the block-related data to other nodes in their communities.

We now provide some exemplary use cases for the purpose of illustration and without limitation.

Example Use Case 1: Double Spends, the "First Seen Rule" and Network Alerts

Satoshi Nakamoto's white paper, "Bitcoin: A Peer-To-Peer Electronic Cash System", introduced the concept of the "first seen rule" in respect of transactions and blocks on the Bitcoin network. According to this rule, when a mining node is evaluating a block in accordance with the protocol, it considers the first seen block to be the first valid block that was broadcast to the network and which is furthest from the Genesis block in a valid chain. This is important in respect of avoiding a "double spend" scenario.

As explained at the Bitcoin SV wiki (wiki.bitcoinsv.io/index.php/First_seen_rule):

> "When two blocks are competing in an orphan race and a node is trying to build upon one of them, if a new block is discovered upon the competitor, the node will stop working on the block it saw first and move to the longest chain . . . When receiving transactions, the first seen rule is applied to determine which transaction is valid in the case of a double-spend. When a node detects a double-spend, it always considers the transaction that it received first as the valid spender of that coin.
>
> The rule has been extended further to add, any blocks which are discovered that include the double-spend transaction, those blocks should also be considered invalid and the node should continue to mine against it, unless a second block is discovered on top of that block, indicating a majority of the network has determined that the other transaction was the first seen."

Therefore, it is vitally important to get communications out to the network as quickly as possible. Each "hop" that has to be made from node to node to completely distribute the information across the network costs time and, therefore, security of the network is decreased. At present, such communications are sent around the network using unicast transmissions, meaning that for each message there is one sender and one receiver, requiring multiple hops as the information is relayed from node to node.

However, in accordance with the present disclosure, a double spend alert can be sent to the mining nodes in the multicast group so that all nodes receive the alert at the same time, as quickly as possible, and can take the necessary remedial action. There are no "hops" from one node to another as each node that has joined the multicast group is listening to the stream and will pick up the message themselves. Therefore, such embodiments provide improvements in terms of processing, time and security in respect of network communications and alerts.

In other example applications, the multicast group may comprise members who are not miners or full nodes on the network, but need to share blockchain-related information such as transactions, blocks, or parts of blocks. For example, one, some or all of the members might be merchants or other parties wishing to send, receive or otherwise process blockchain transactions. In some cases, the merchants may wish to perform an SPV verification of a transaction and need to share information regarding Merkle paths and block headers for use in the SPV verification. The block discovery creates a hash header or block header. These are sent to all SPV nodes. The use of multicast transmission enables the delivery of this data in a near instant communication.

In another example, the sending resource may be a source of digital currency such as a central bank, and the receivers may be banks or other financial institutions that process that digital currency. The central bank may, for example, issue a Central Bank Digital Currency (CBDC). In respect of traditional cash, a minting source distributes the physical notes and coins to individual banks by transporting it in vehicles. With the case of digital cash, the distribution can be handled via a multicast group wherein the members of the group are the banks that the central bank wishes to distribute the funds to.

Example Use Case 2: Distributed Blockchain Functionalities

Embodiments can be used in respect of any type of data, and the sending and/or receiving resources can be arranged or operative to perform any type of functionality. In one non-limiting example, data relating to a Merkle challenge substantially as described in International patent application PCT/EP2023/051529 may be sent to a multicast group. In such a scenario, a resource wishes to delegate storage of a file or other resource to multiple storage providers so the sending resource generates a Merkle tree which represents various segments of the file and then sends the file to one or more storage providers. Later, when the sending resource wishes to confirm that a storage provider still has an unaltered copy of the data they were sent, the sender alters the data in a particular way, re-calculates the Merkle root for the tree, and asks the storage provider to make the same alteration to their copy and send back their recalculated Merkle root. The resource can quickly confirm whether the storage provider was able to provide the expected Merkle root. If the Merkle root that is sent back does not match what the resource expects it to be, the storage provider's copy must have been compromised or altered in some way. When used in conjunction with the present disclosure, the resource may send separate parts of the file to different storage providers, each of which are members of a given multicast group. When confirmation of the file's integrity is required, or re-assembly of the constituent parts is required, the resource requests this by poling the group.

In another example use case, the data that is sent to the multicast group is blockchain related data in the sense that it forms at least part of a blockchain transaction or block of transactions, at least part of a locking or unlocking script, or comprises data relating to a Merkle proof/path, or data for use in implementing a consensus mechanism e.g. PoW or PoS related data. The Merkle proof data may comprise data relating to a blockchain transaction and data for proving (or validating) that the transaction is contained within a particular block. Merkle proofs and their use for verifying the transactions in a block are known in the art, along with related techniques such as Simplified Payment Verification (SPV). Other, non-limiting examples of blockchain related data could include data for use with, or associated with, a consensus mechanism of a blockchain network. For example, this could be data relating to a proof-of-work PoW calculation or some other blockchain consensus mechanism. In one example, this could be data relating to a PoW calculation such as described in UK patent application number GB2206634.4.

When used for blockchain-related purposes, at least one receiving resource in the group may be arranged, configured and/or operative to perform one or more of the following:

- a functionality specified and/or required/needed by a blockchain protocol;
- a calculation or other operation related to a mining or consensus function specified in a blockchain protocol;
- a Simplified Payment Verification (SPV) operation;
- a validation of a blockchain transaction before or after it has been written to a blockchain;
- a search of a blockchain to identify, locate and/or confirm the presence of a given transaction or block within a blockchain;
- generation of a blockchain transaction, submission of a transaction to the blockchain, and/or broadcast a transaction to a blockchain network.

Example Use Case 3: Resolving Packet Loss

In other examples, a combination of multicast, anycast and unicast transmissions can be used to advantage by members of a multicast group to ensure or achieve incomplete receipt of data from a sending resource. Consider a scenario in which a sending resource wishes to send a portion of data to all members of a multicast group, but a receiving member of the group fails to receive all of the transmitted data. This is not an uncommon challenge within networking (see en.wikipedia.org/wiki/Packet loss).

Say, for example, a multicast transmission comprising 10 packets of data is sent to a multicast group but a particular group member (which can be referred to as the receiving resource) has only received 8 of the 10 data packets that were sent. The receiving resource is missing packets 2 and 7. The receiving resource may obtain the missing data packets by requesting them from the closest member of the multicast group using an anycast transmission. The receiving resource knows that the other group members will all have received the data transmission because it was sent to the multicast group.

This solution may be performed using the following method, comprising the steps:

1. using a multicast transmission to send a portion of data (plurality of data packets) from a sending resource to a group of resources associated with a multicast address;
2. determining, at a resource within the group of resources, that the resource has not received the complete portion of data;
3. sending an anycast transmission from the resource to the closest other member of the multicast group requesting the missing sub-portions (packets) of the data that have not been received by the resource; and/or
4. receiving, at the resource from the closest other member of the multicast group, the missing (dropped) sub-portions of data. The missing sub-portions of data may be provided to the resource from the closest other member by any suitable method such as unicast.

This provides a solution to the technical problem of how to solve or address packet loss. The use of an initial transmission via multicast, combined with recovery of the dropped packets using an anycast request to the closest member and a unicast response providing the dropped data, provides an efficient and swift approach. As with other use case examples and embodiments, this technique can be utilised with any type of data, and by any type of resource including, but not limited to, blockchain related data/resources.

Coordination and Distribution of Performance of Tasks and/or Processing Requests Using Multicast and Anycast Transmissions In accordance with some embodiments, multicast transmission and anycast transmission can be employed to coordinate and distribute tasks and/or processing requests amongst groups of resources on a network. In one embodiment, the groups of resources can include full (mining) nodes 104 that run the client software for a given protocol, or other resources of a blockchain network e.g. lightweight nodes that implement all or part of a particular blockchain protocol (e.g., Bitcoin SV protocol). These could include wallets. In some embodiments, the nodes may be nodes of, in or on an overlay network that overlays the blockchain network. In such examples, the overlay nodes are not full mining nodes 104. For example, the groups of resources can include miner pools or a set of PoW calculating resources, or resources which process data in some way for blockchain and/or cryptocurrency-related purposes. These could include, for example, providers of digital wallets, cryptocurrency exchanges, banks and financial institutions, distributed verification providers, etc. In this embodiment, the tasks and/or processing requests can relate to blockchain transactions or other blockchain data, such as validating one or more blockchain transactions, mining a block of transactions using proof-of-work calculating resources or creating a block of transactions using a proof-of-stake consensus mechanism, simplified payment verification, or processing data in some way for blockchain and/or cryptocurrency-related purposes.

Figure 16:
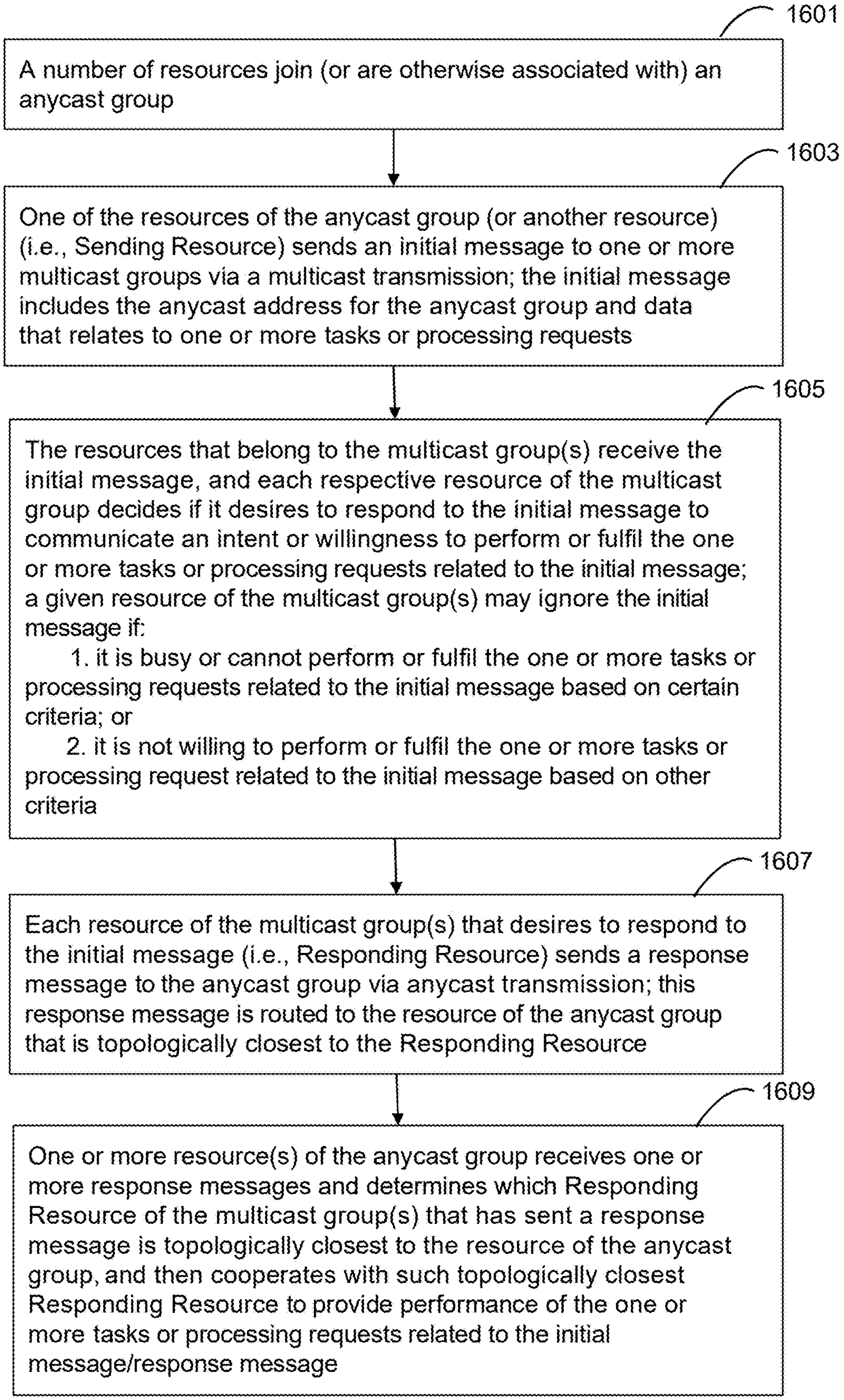
FIG. 16 is a flowchart that illustrates an example method that employs multicast transmission and anycast transmission to coordinate and distribute tasks and/or processing requests amongst groups of resources on a network.

FIG. 16 provides an illustration of a method that uses multicast and anycast transmissions to coordinate and distribute tasks and/or processing requests amongst groups of resources on a network.

The method begins in 1601 where a number of resources join (or are otherwise associated with an anycast group. The anycast group is associated with the anycast address for the anycast group.

In 1603, one of the resources of the anycast group (or some other resource that need not be part of the anycast group) (i.e., Sending Resource) sends an initial message to one or more multicast groups via a multicast transmission. The initial message is represented by one or more data packets. The initial message is sent to the multicast address for each given multicast group(s). The initial message includes the anycast address for the anycast group and data that relates to one or more tasks or processing requests.

In 1605, the resources that belong to the multicast group(s) receive the initial message, and each respective resource of the multicast group decides if it desires or is able to respond to the initial message to communicate an intent, ability or willingness to perform or fulfil the one or more tasks or processing requests related to the initial message. A given resource of the multicast group(s) may ignore the initial message if:

1. it is busy or cannot perform or fulfil the one or more tasks or processing requests related to the initial message based on certain criteria; or
2. it is not willing to perform or fulfil the one or more tasks or processing request related to the initial message based on other criteria. For example, the processing request may not comply with a policy or rule implemented within or by its organisation.

In 1607, each resource of the multicast group(s) that desires to respond to the initial message (i.e., Responding Resource) sends a response message to the anycast group via anycast transmission. The response message is represented by one or more data packets. The response message is sent to the anycast address for the anycast group. This response message is routed to the resource of the anycast group that is topologically closest to the Responding Resource.

In 1609, one or more resource(s) of the anycast group receives one or more response messages and determines which Responding Resource of the multicast group(s) that has sent a response message is topologically closest to the resource of the anycast group, and then cooperates with such topologically closest Responding Resource to provide performance of the one or more tasks or processing requests related to the initial message/response message. In embodiments, the topologically closest Responding Resource can deliver data packets that include the results from the performance of the one or more tasks or processing requests to the anycast group by sending such data packets to the anycast address of the anycast group. The resource of the anycast group that receives such data packets may then forward such data to the other resources of the anycast group using multicast transmission or alternatively using unicast (direct) transmission. The methodology provides for coordination and distribution of tasks and/or processing requests amongst resources of the two groups (the anycast group and the multicast group) that are topologically closest to one another. This can be advantageous in distributed environments where speed of network communication (or minimization of network latency) between the resources of the two groups can influence operations, efficiency, and/or economic rewards awarded to the resources. For example, in a blockchain network where the groups of resources include miner pools or a set of PoW calculating resources that operate as part of the consensus mechanism of the blockchain network, the coordination and distribution of tasks and/or processing requests can minimize network latency between the resources in order to improve the computation efficiency of the resources with the goal of maximizing the economic rewards awarded to the resources as part of the consensus mechanism (e.g., where the resources are rewarded for winning a race to assemble a new valid block of transactions by solving a cryptographic puzzle).

Figure 17A:
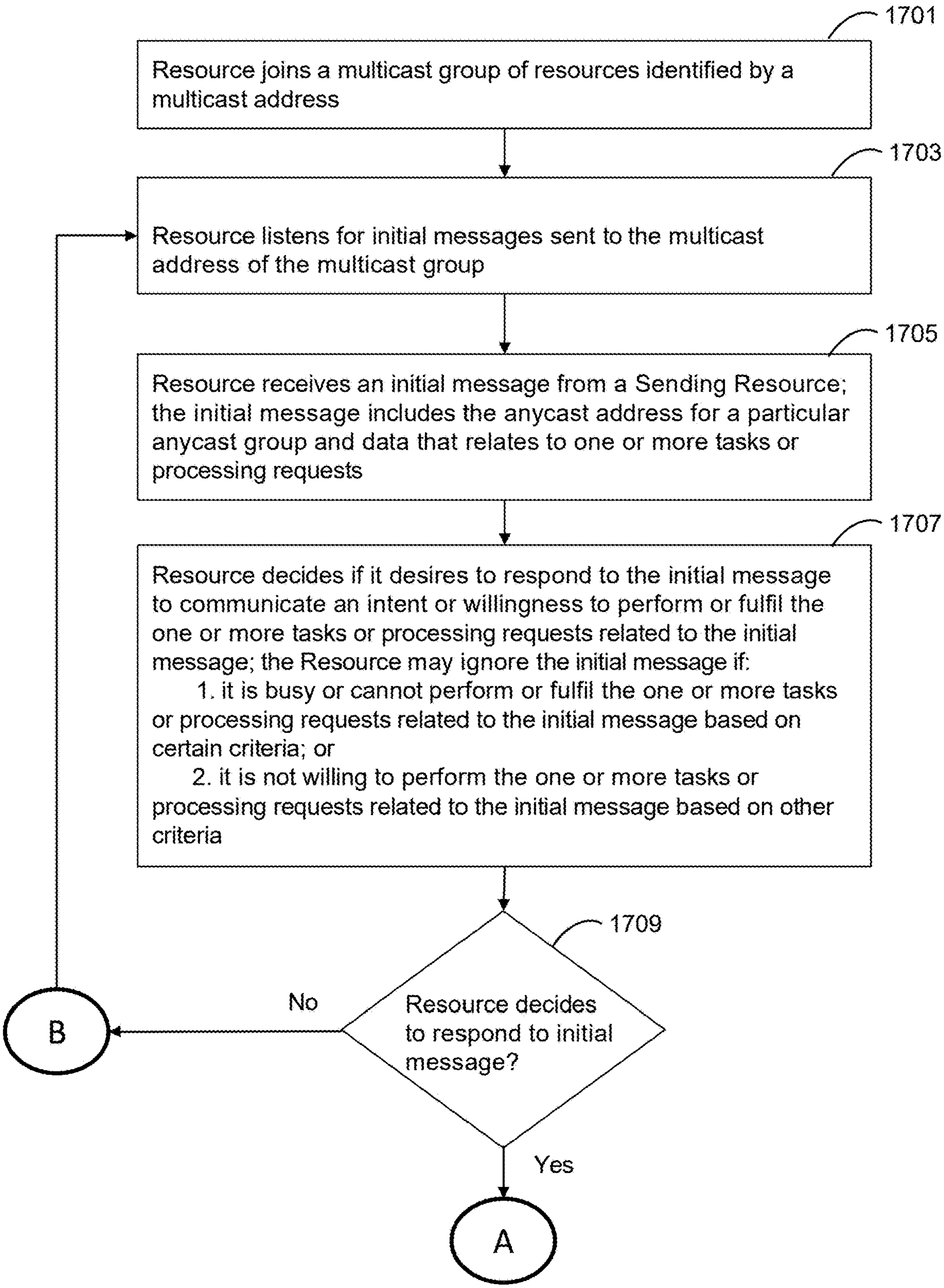
FIGS. 17A and 17B, collectively, is a flowchart that illustrates parts of the method of FIG. 6 from the perspective of a sending resource which belongs to an anycast group.
Figure 17B:
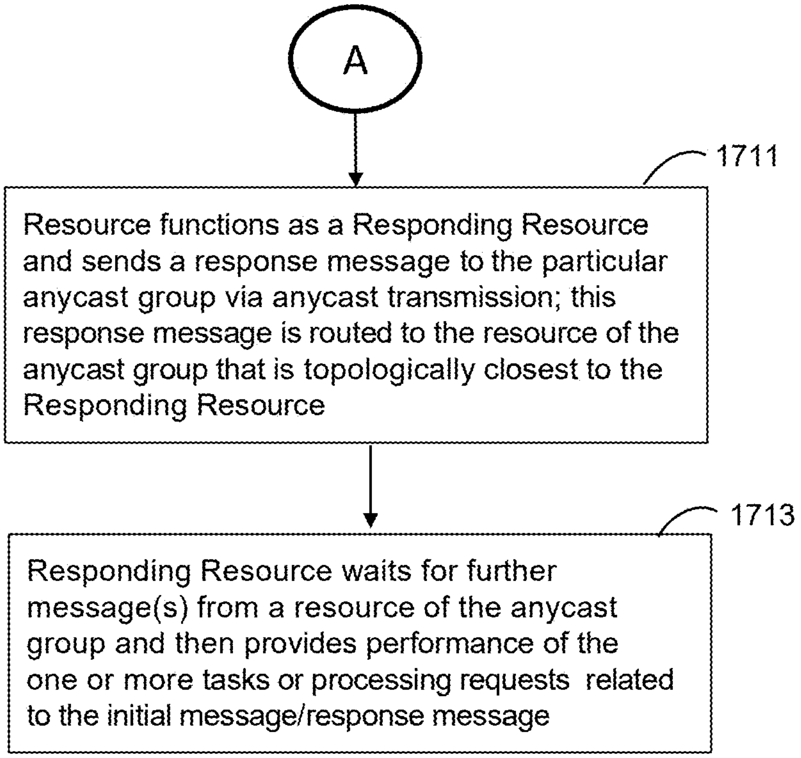

FIGS. 17A and 17B depicts the operation of a Receiving Resource as part of the method of FIG. 16, which is configured to listen for and receive an initial messages transmitted over the network using multicast transmission.

In 1701, a resource joins a multicast group of resources that is identified by a multicast address.

In 1703, the resource listens for initial messages sent to the multicast group address.

In 1705, the resource receives an initial message from a Sending Resource (see 1603). The initial message is sent to the multicast address for the multicast group. The initial message includes the anycast address for a particular anycast group (which is used in the response message) and data that relates to one or more tasks or processing requests.

In 1707, the resource decides if it desires to respond to the initial message to communicate an intent, ability or willingness to perform or fulfil the one or more tasks or processing requests related to the initial message. The resource may ignore the initial message if:

1. it is busy or cannot perform or fulfil the one or more tasks or processing requests related to the initial message based on certain criteria; or
2. it is not willing to perform or fulfil the one or more tasks or processing requests related to the initial message based on other criteria In 1709, if the resource decides to respond to initial message, the operations of the resource continue to 1711. Otherwise, the operations of the resource revert to 1703 to listen for, receive, and process one or more other initial messages.

In 1711, the resource functions as a Responding Resource and sends a response message to the particular anycast group (using the anycast address specified in the initial message) via anycast transmission. The response message is sent to the anycast address for the particular anycast group (which is extracted and copied from the initial message). This response message is routed to the resource of the particular anycast group that is topologically closest to the Responding Resource.

In 1713, the resource (i.e., Responding Resource) waits for further message(s) from a resource of the particular anycast group and then provides performance of the one or more tasks or processing requests related to the initial message/response message. The further message(s) can be sent from the anycast group member that is topologically closest to the responding resource.

Figure 18A:
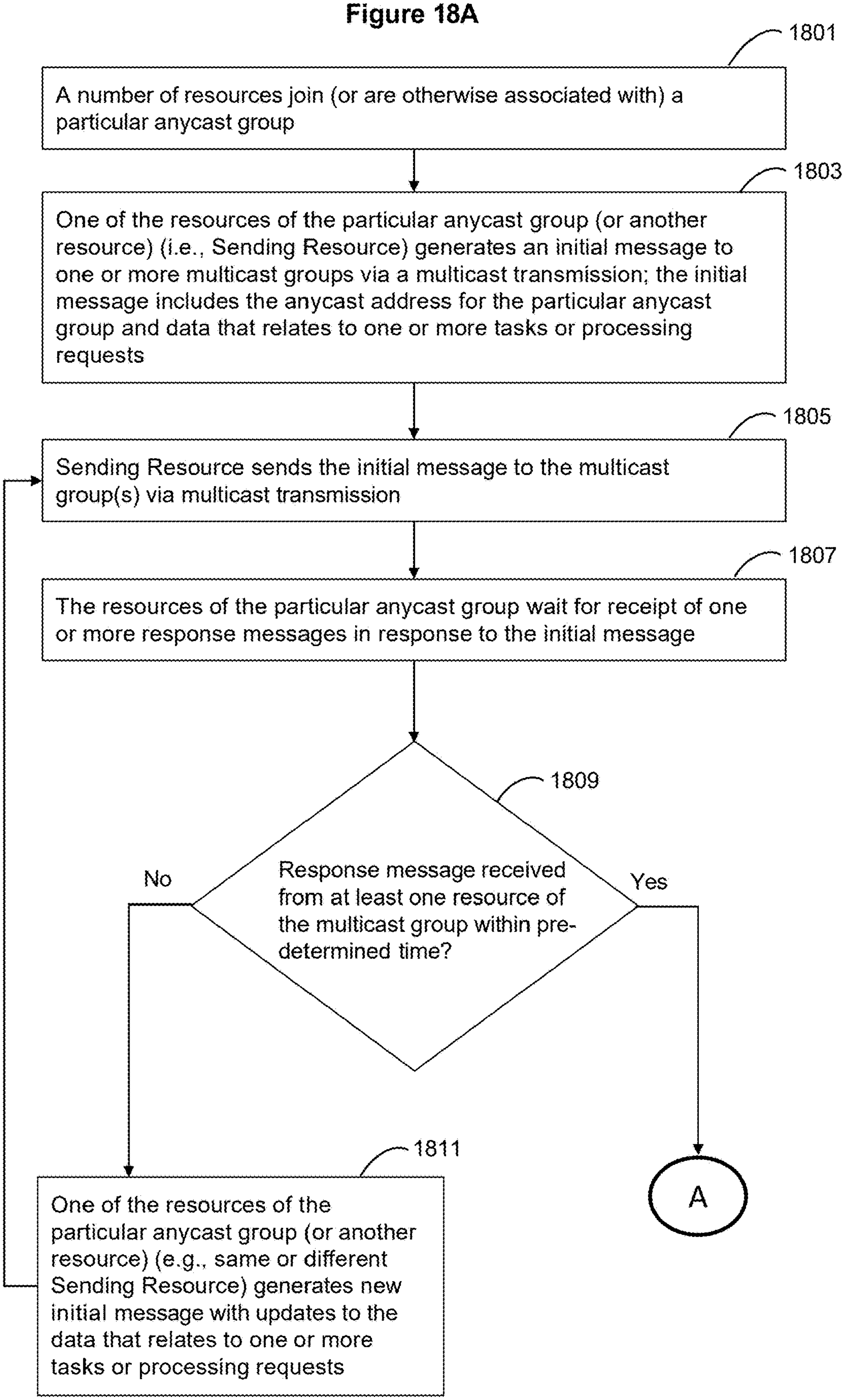
FIGS. 18A and 18B, collectively, is a flowchart that illustrates parts of the method of FIG. 16 from the perspective of a receiving resource which belongs to a multicast group.
Figure 18B:
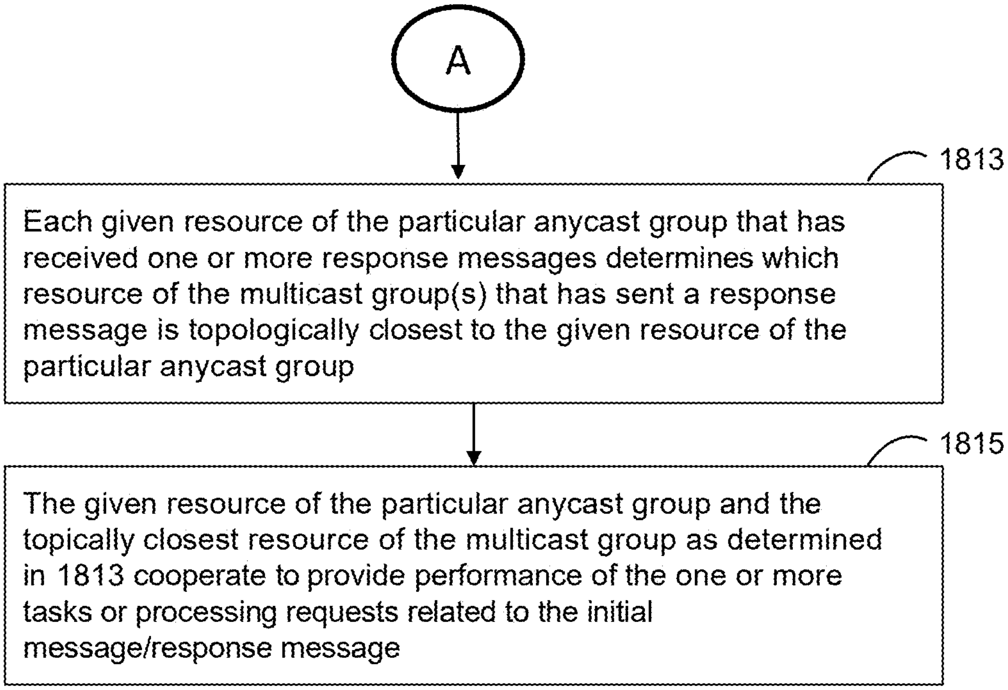

FIGS. 18A and 18B depicts the operation of a Sending Resource as part of the method of FIG. 16, which is configured to generate and send initial messages transmitted over the network using multicast transmission.

In 1801, a number of resources join (or are otherwise associated with) a particular anycast group. The particular anycast group is associated with the unique anycast address for the particular anycast group.

In 1803, one of the resources of the particular anycast group (or another resource that need not be part of the particular anycast group) (i.e., Sending Resource) generates an initial message to one or more multicast groups via a multicast transmission. The initial message includes the anycast address for the particular anycast group (which is used in the response message) and data that relates to one or more tasks or processing requests.

In 1805, the Sending Resource sends the initial message to the multicast group(s) via multicast transmission. The initial message is sent to the multicast address for each given multicast group(s).

In 1807, the resources of the particular anycast group wait for receipt of one or more response messages in response to the initial message.

In 1809, when no response message is received from at least one resource of the multicast group within a pre-determined time period, the operations continue to 1811. Otherwise (for the case where a response message is received from at least one resource of the multicast group within the pre-determined time period), the operations continue to 1813.

In 1811, one of the resources of the particular anycast group (or another resource that need not be part of the particular anycast group (e.g., the same or different Sending Resource) generates a new initial message with updates to the data that relates to one or more tasks or processing requests and the operations revert to 1805 to 1809 to send the new initial message to the one or more multicast groups via multicast transmission and listen for and process response messages related thereto. For example, a payment amount can be updated to increase a reward for performance of the task(s), or an alteration to original parameters or criteria contained in the initial message.

In 1813, each given resource of the particular anycast group that has received one or more response messages determines which resource of the multicast group(s) that has sent a response message is topologically closest to the given resource of the particular anycast group. Such operations can employ a traceroute utility, which is a command-line utility available in most all operating systems. It provides the complete route to a destination address and also shows the time taken (or delays) between intermediate routers in the route. The output of the traceroute represents the number of hops and the delays in the route to the destination address. This information can be gathered for the route(s) to each resource of the multicast group(s) that has sent a response message, and such information can be processed to determine which resource of the multicast group(s) that has sent a response message is topologically closest to the given resource of the particular anycast group. Additionally, or alternatively, other suitable networking utilities can be used as well. In 1815, the given resource of the particular anycast group and the topically closest resource of the multicast group as determined in 1813 cooperate to provide performance of the one or more tasks or processing requests related to the initial message/response message. In embodiments, the one or more tasks or processing requests can relate to blockchain transactions, blockchain blocks or other blockchain related data, arranged or related to operations such as validating one or more blockchain transactions, mining a block of transactions using proof-of-work calculating resources or creating a block of transactions using a proof-of-stake consensus mechanism, simplified payment verification, or processing data in some way for blockchain and/or cryptocurrency-related purposes.

Enumerated Clauses:

Enumerated clauses are now provided for the purpose of illustrative some possible embodiments that may be provided in accordance with the disclosure. The clause sets provided below are for illustration and not to be construed as limiting, exclusive or exhaustive. Features recited in one clause set may be utilised and incorporated into one or more of the other clause sets. In any one or more of the following clause sets, embodiments may provide a computer implemented method, and/or a data distribution method. Additionally, or alternatively, embodiments may provide improved data transmission or exchange methods or improved electronic communications.

A computer implemented data distribution method is disclosed. The method may comprise sending a portion of (e.g., blockchain-related) data from a sending resource to one or more groups of receiving resources; each of the one or more groups may be associated with a respective address; the address may be a multicast address. Phrased another way, groups of resources may be formed wherein, for each group, resources are subscribing members of the group, and all members are associated with an address that identifies that group.

In one possible form of wording, the method may comprise one, some or all of the following steps:

- sending an initial message from a sending resource to a group of at least one receiving resource which are subscribed to a multicast group of resources; the initial message is sent to a multicast address associated with the multicast group of resources and comprises an anycast address associated with an anycast group of resources and data relating to a task to be performed;
- Receiving an initial message from a sending resource and by a group of at least one receiving resources which are subscribed to a multicast group of resources; the initial message is sent to a multicast address associated with the multicast group of resources, and comprises an anycast address associated with an anycast group of resources and data relating to a task to be performed;
- Sending a respective response message from at least one of the receiving resources to the anycast address;
- Receiving the response message from the at least one receiving resources at the anycast group of resources;
- for each (respective) resource in the anycast group of resources: determining which of the at least one receiving resources that has sent a response message is the topologically closest to the (respective) resource in the anycast group;
- Determining, based on the determination results of the previous step, which of the receiving resources is the topologically closest to (an identified, particular member of) the anycast group of resources;
- Sending a confirmation message from the (identified, particular) member of the anycast group to receiving resource that is the topologically closest resource in the multicast group of resources, the confirmation message containing data that confirms the ability, intent or willingness of the (identified, particular) resource in the anycast group of resources to cooperate with the topologically closest receiving resource to perform the task;
- Receiving a confirmation message from the (identified, particular) member of the anycast group by the receiving resource that is the topologically closest resource in the multicast group of resources relative to the (identified, particular) member of the anycast group, the confirmation message containing data that confirms the ability, intent or willingness of the (identified, particular) resource in the anycast group of resources to cooperate with the topologically closest receiving resource to perform the task;
- Performing the task at, by or on behalf of the topologically closest receiving resource.

One some or all of the receiving resources may be a full node 104 on a blockchain network, or a node in an overlay network that sits on top of but communicates with one or more full node(s) on the blockchain network. The sending resource may be a full blockchain node 104 or a node on an blockchain overlay network that sits on top of but communicates with one or more full node(s) on the blockchain network. These features may apply to one or more of the clause sets provided below.

Some embodiments may provide solutions for implementing a mempool for a blockchain network.

Some embodiments may provide solutions for implementing a UTXO set for a blockchain network.

Also disclosed herein is:

- computer equipment comprising memory comprising one or more memory units and processing apparatus comprising one or more processing units, wherein the memory stores code arranged to run on the processing apparatus, the code being configured so as when on the processing apparatus to perform the method of any embodiment described or defined herein; and/or
- a computer program embodied on computer-readable storage and configured so as, when run on one or more processors, to perform the method of any described or defined herein.

Clause Set 1:

Embodiments disclosed herein may provide methods and techniques that employ multicast transmission and anycast transmission to coordinate and distribute tasks and/or processing requests amongst groups of resources on a network. In one embodiment, the groups of resources can include nodes or other resources of a blockchain network that implement all or part of a particular blockchain protocol (e.g., Bitcoin SV protocol). The embodiments may be arranged to minimize network latency between the resources in order to improve the computational efficiency of the resources.

Clause 1a: In one possible form of wording, such an embodiment may comprise a method having the one or more of the following steps:

- associating a first group of resources with an anycast group having a particular anycast address;
- sending an initial message from a sending resource to a particular multicast address, the initial message including i) the particular anycast address for the anycast group and ii) data that relates to one or more tasks or processing requests;
- in response to receiving the initial message, at least one resource belonging to the multicast group sending a response message to the particular anycast address corresponding to the anycast group, wherein the response message communicates an acceptance of the one or more tasks or processing requests related to the initial message.

The multicast address corresponds to a multicast group (of computing resources) associated with the particular multicast address.

The method may further comprise the step of associating the second group of resources with a multicast group having a particular multicast address. This may comprise each member (i.e. resource) of the second group of resources subscribing to the multicast address. Put another way, each member of the second group of resources joins the multicast group associated with the multicast address.

The acceptance of the one or more tasks or processing requests may comprise the communication of an ability, intent or willingness to perform or fulfil the one or more tasks or processing requests related to the initial message.

The initial message may comprise a one or more of a description of at least one task or process to be performed, a payment or reward associated with performance of the task or process, data, values, parameters and/or metadata relating to the task/process.

The acceptance may comprise a request for further data relating to the at least one task or process.

Clause 1b:

In an alternative or additional form of wording, such an embodiment may comprise a method which includes one, some or all of the following steps:

Sending data (e.g., at least one data packet) across an electronic network from one or more sending resources to one or more receiving resources; the one or more receiving resources may be members of a multicast group that is associated with a particular multicast address; additionally, one or more of the sending resources may be members of an anycast group that is associated with a particular anycast address.

Clause 1c: In an alternative or additional form of wording, such an embodiment may comprise a method which includes one, some or all of the following steps:

- receiving, by a receiving resource that is a member of a multicast group, an initial message that:
  - i) is sent from a sending resource to a multicast address associated with the multicast group; and
  - ii) includes a) an anycast address corresponding to an anycast group and b) data that relates to one or more tasks or processing requests;
- sending, by the receiving resource and in response to receiving the initial message, a response message to the anycast address, wherein the response message communicates and/or comprises an acceptance of the one or more tasks or processing requests included to the initial message.

Any feature(s) provided in relation to any of clauses 1a, 1b and 1b may be used in respect of any of the other wordings of clause 1. In other words, features in 1a, 1b, 1c can be used interchangeably between the wordings of clause 1.

The following clauses may follow from any wording of clause 1 provided above.

2. The method according to clause 1, which further includes at least one of:

- 2.1 associating a first group of resources with an anycast group having a particular anycast address; and/or
- 2.2 associating a second group of resources to a multicast group having a particular multicast address; and/or
- 2.3 sending an initial message (i.e., one or more data packets) from a sending resource to the particular multicast address corresponding to multicast group; the sending resource can belong to the anycast group or not belong to the anycast group; the initial message includes i) the particular anycast address for the anycast group and ii) data that relates to one or more tasks or processing requests; and/or
- 2.4 routing the initial message to each resource of the multicast group.

3. The method according to any one of clauses 1, 2.1, 2.2, 2.3 and 2.4, which further includes, in response to receiving data (i.e., an initial message), at least one resource belonging to the multicast group (receiving resources) sending a response message (e.g., at least one data packet) to a particular anycast address corresponding to the anycast group, wherein the response message communicates an intent or willingness to perform or fulfil the one or more tasks or processing requests related to the received data (i.e., initial message).

4. The method according to clause 3, which further includes at least one of:

4.1 routing the response message to one resource of the anycast group that is topologically closest to the resource of the multicast group that sent the response message; and/or 4.2 in response to receiving a response message, at least one resource(s) of the anycast group determining which resource of the multicast group (receiving resources) that has sent a response message is topologically closest to the resource of the anycast group; and/or 4.3 the resource(s) of the anycast group using a traceroute utility to determine which resource of the multicast group that has sent a response message is topologically closest to the resource of the anycast group uses; and/or 4.4 at least one resource(s) of the anycast group cooperating with such topologically closest resource of the multicast group (receiving resources) to provide performance of the one or more tasks or processing requests related to the initial message and response message; and/or 4.5 configuring at least one resource of the multicast group (receiving resources) to decide not to respond to the initial message in the event that it is busy or cannot perform or fulfil the one or more tasks or processing requests related to the initial message based on certain criteria; and/or configuring at least one resource of the multicast group (receiving resources) to decide not to respond to the initial message in the event that it is not willing to perform or fulfil the one or more tasks or processing requests related to the initial message based on other criteria.

In accordance with an additional or alternative form of wording, the method may comprise:

Determining, by each respective member of the anycast group, which responding member of the multicast group is topologically closest to it ('it' being each respective member of the anycast group); and/or Determining, based on the determinations made by all respective members of the anycast group, which of the receiving resources that has sent a response message is topologically closest to a member of the anycast group. In other words, based on the determinations made by the individual members of the anycast group, the shortest route between the anycast group and the responding multicast group members is determined. The multicast group member that is topologically closest is thus identified and becomes the resource that the closest anycast group member will continue the communications and collaboration with in order to complete the task in the fastest and most efficient manner.

5. The method according to any one of clauses 1, 2.1, 2.2, 2.3 and 2.4, 3, 4.1, 4.2, 4.3, 4.4, and 4.5, wherein the first group of resources and/or the second group of resources can include resources that validate one or more blockchain transactions, miner pools or a set of proof-of-work calculating resources, resources that create a block of transactions using proof-o-work or proof-of-stake consensus, or resources which process data in some way for blockchain and/or cryptocurrency-related purposes;

6. The method according to any one of clauses 1, 2.1, 2.2, 2.3 and 2.4, 3, 4.1, 4.2, 4.3, 4.4, 4.5, and 5, wherein the one or more tasks or processing requests relate to blockchain transactions, blockchain blocks or other blockchain related data.

7. The method according to any one of clauses 1, 2.1, 2.2, 2.3 and 2.4, 3, 4.1, 4.2, 4.3, 4.4, 4.5, 5 and 6, wherein the one or more tasks or processing requests relate to:

validating one or more blockchain transactions, mining a block of transactions using proof-of-work calculating resources, creating a block of transactions using a Proof-of-Stake consensus mechanism, simplified payment verification, or processing data in some way for blockchain and/or cryptocurrency-related purposes.

Clause Set 2:

Additionally or alternatively, one or more embodiments of the disclosure can be defined in accordance with the following clauses. Any of the clauses defined in clause set 2 may be combined with one or more of the clauses of any other clause set provided herein, or any other feature disclosed herein.

Clause 2.1 A method comprising:

sending, by a receiving resource, a request for blockchain-related data to a sending address associated with members of one of a plurality of groups of sending resources on a network; and receiving blockchain-related data from at least one sending resource of the group in response to the request.

The sending address may be a sending anycast address or multicast address. The method may be a computer-implemented data distribution method. Additionally, or alternatively, it may be an improved data transmission or exchange method or electronic communication method.

Clause 2.2 The method of clause 2.1, wherein receiving the blockchain-related data comprises receiving the blockchain-related data via a unicast or multicast transmission from the at least one sending resource.

Clause 2.3 The method of clause 2.2 or 2.1, wherein receiving the blockchain-related data comprises receiving the blockchain-related data via an anycast transmission from the at least one sending resource.

Clause 2.4 The method of any preceding clause, wherein the received blockchain-related data comprises one or a plurality of portions of blockchain-related data received from a plurality of members of the group.

Clause 2.5 The method of clause 2.4 wherein each portion of blockchain-related data comprises a hash of the respective portion.

Clause 2.6 The method of any preceding clause, comprising sending an anycast or multicast query transmission and receiving, (from a nearest sending resource), at least part of: a blockchain block, a blockchain transaction and/or a Merkle path in response to the anycast or multicast query transmission.

Clause 2.7 The method of any preceding clause, wherein the sending address is associated with sending resources which are in possession of a complete copy of a blockchain block.

Clause 2.8 The method of clause 2.7, comprising receiving, from a (topologically) nearest receiving resource, an anycast or multicast query transmission and sending, to the (topologically) nearest receiving resource, at least part of: a blockchain block, a blockchain transaction and/or Merkle path in response to the anycast or multicast query transmission.

Clause 2.9 A method (e.g. computer implemented data distribution method) comprising: sending, by a sending resource, blockchain-related data to a receiving address associated with members of one of a plurality of groups of receiving resources on a network. The receiving address may be an anycast or multicast address.

Clause 2.10 The method of any preceding clause, wherein the blockchain-related data comprises a hash of the data.

Clause 2.11 The method of clause 2.9 or 2.10, comprising de-assigning the sending resource from a sending address.

Clause 2.12 The method of clause 2.12, wherein the de-assigning is performed in response to a determination that a predetermined condition has been met e.g. that the blockchain-related data was sent to a predetermined number of receiving resources, and/or that a certain amount of time has elapsed, or a given date and time is reached etc Clause 2.13 The method of clause 2.12, wherein the de-assigning is performed in response to a determination that a preselected time period has elapsed.

Clause Set 3:

Additionally or alternatively, one or more embodiments of the disclosure can be defined in accordance with the following clauses. Any of the clauses defined in clause set 3 may be combined with one or more of the clauses of any other clause set provided herein, or any other feature disclosed herein.

Clause 3.1. A computer implemented data distribution method comprising:

- sending a portion of blockchain-related data from a (or at least one) sending resource on a network to one or more groups of receiving resources on a/the network, wherein each of the one or more groups is associated with a respective multicast address. The network may be the internet. In a preferred embodiment, all receiving resources in each group shares a common multicast address that is unique for that group; each group of resources has a respective multicast address that all of the group's members subscribe to in order to receive multicast transmissions sent to that group's shared multicast address.

The at least one sending resource may send the portion of data via a transmission. The data portion(s) may be sent to the at least one group of receiving resources in response to a request or as part of a request. The request may comprise a request for data. The request may comprise blockchain related data such a data relating to one or more blockchain transactions or transaction IDs (TxIDs), one or more blockchain blocks or block header(s) and/or at least part of a Merkle path or proof. The data may be sent via the internet.

Clause 3.2. A method according to claim Clause 3.1 wherein the sending resource and/or one, some or all of the receiving resources in at least one of the one or more groups is/are or comprises:

- a node in a network; this may be a blockchain network or the internet or a telecommunications network; or a node in an overlay network that is an overlay relative to the (underlying) blockchain network;
- a computing resource associated with or controlled by a financial institution;
- a merchant resource;
- a cryptocurrency exchange;
- a computing resource arranged to perform or facilitate an SPV verification, or use the result of an SPV verification;
- a provider of blockchain-related services; and/or
- a digital wallet.

Clause 3.3. A method according to Clause 3.1 or Clause 3.2, wherein the data comprises:

- a communication or alert relating to a blockchain related event or activity.

Clause 3.4. A method according to Clause 3.3, wherein the alert relates to a double spend or double spend attempt within the blockchain network.

Clause 3.5. A method according to any preceding clause, wherein the blockchain related data comprises one, some or all of:

- i) at least part of a blockchain transaction;
- ii) at least part of a blockchain block;
- iii) at least part of a blockchain transaction script;
- iv) at least part of a Merkle path, Merkle tree or Merkle proof;
- v) data for use with, or associated with, a consensus mechanism of a blockchain network
- vi) the result of a proof or stake or proof of work operation;
- vi) the result of a verification operation comprising the verification of a blockchain block or an SPV verification.

Clause 3.6. A method according to any preceding clause, wherein the blockchain-related data is sent by the sending resource to the one or more groups of receiving resources using a multicast communication.

Clause 3.7. A method according to any preceding clause, wherein:

- i) the multicast address is an IP multicast address; and/or
- ii) the multicast address is a IPv6 multicast address; and/or
- iii) the blockchain-related data is sent to the one or more groups of receiving resources over the Internet.

Clause 3.8. A method according to any preceding clause wherein:

- each of the one or more groups of receiving hosts comprises one or a plurality of receiving resources; and/or
- each receiving peer within a given group of receiving resources is operative to receive data sent to the multicast address of the particular group of receiving resources.

Clause 3.9. a method according to any preceding clause and comprising the step:

- subscribing, by a resource, to a group of receiving resources; preferably wherein the resource subscribes by sending a signal to a/the network; (the network may be the internet)
- leaving, by a resource, a group of receiving resources; preferably wherein the resource leaves the group by ceasing to send a signal to the network.

Clause 3.10. A method according to any preceding clause wherein:

- the sending and/or at least one receiving resource in the at least one or more groups of receiving resources is arranged, configured and/or operative to perform one or more of the following:
  - a functionality specified by a blockchain protocol;
  - a calculation or other operation related to a mining or consensus function specified in a blockchain protocol;
  - a Simplified Payment Verification (SPV) operation;
  - the calculation or verification of a Merkle path, proof or root of a Merkle path;
  - a validation of a blockchain transaction before or after it has been written to a blockchain;

a search of a blockchain to identify, locate and/or confirm the presence of a given transaction or block within a blockchain;

generate a blockchain transaction, write a transaction to the blockchain, and/or broadcast a transaction to a blockchain network.

Clause 3.11. A method according to any preceding claim and comprising the step of:

poling each of the one or more groups for a target response by sending the portion of blockchain-related data from the sending resource to the one or more groups of receiving resources.

Clause 3.12. A computer-implemented method comprising the steps:

sending a multicast communication to a group of resources on a blockchain network.

Clause 3.13. A method according to clause 12, wherein at least one, some or all of the following apply:

i) the communication is sent from a sending resource to the group of resources;

ii) the group of resources is a multicast group, and one or some of the resources in the group of resources is a receiving resource of the multicast group;

iii) the communication relates to a double spend or double spend attempt within the network;

iv) the communication is an alert.

Clause 3.14. Computer equipment comprising:

memory comprising one or more memory units; and processing apparatus comprising one or more processing units, wherein the memory stores code arranged to run on the processing apparatus, the code being configured so as when on the processing apparatus to perform the method of any of Clauses 3.1 to 3.13.

Clause 3.15. A computer program embodied on computer-readable storage and configured so as, when run on one or more processors, to perform the method of any of clauses 3.1 to 3.13.

Clause Set 4:

Additionally, or alternatively, one or more embodiments of the disclosure can be defined in accordance with the following clauses. Any of the clauses defined in clause set 4 may be combined with one or more of the clauses of any other clause set provided herein, or any other feature disclosed herein.

Clause 4.1. A method comprising the steps:

sending a multicast communication from a sending resource to at least one group of resources, wherein preferably:

i) the sending resource and/or at least one resource in the at least one group is or comprises:

a node on a blockchain network; and/or a digital wallet or a digital wallet provider; and/or a cryptocurrency exchange; and/or a resource associated with one or a plurality of blockchain mining nodes; and/or a service provider arranged to provide blockchain-related services to one or more users.

Clause 4.2. A method according to clause 4.1, wherein:

i) the communication is sent over a public network, preferably the Internet; and/or ii) the at least one group of resources is a multicast group comprising member resources arranged or operative to receive communications sent to a (multicast) address associated with the multicast group; and/or iii) the communication relates to a double spend or double spend attempt within the network; and/or iv) the communication is an alert or other communication comprising blockchain-related data.

Clause Set 5:

Additionally, or alternatively, one or more embodiments of the disclosure can be defined in accordance with the following clauses. Any of the clauses defined in clause set 5 may be combined with one or more of the clauses of any other clause set provided herein, or any other feature disclosed herein.

Embodiments disclosed herein may provide methods and techniques for improved electronic communications between resources over a network. The embodiments may be arranged to ensure or improve the reliability of a data exchange between the parties or transfer from one to another of the parties. In one possible form of wording, such an embodiment may comprise a method which includes one, some or all of the following steps:

Sending at least one data packet across an electronic network from one or more sending resources to one or more receiving resources. The one or more resources may be members of a multicast group. In other words, they may be subscribers to a common (shared) multicast address; additionally, or alternatively, one or more of the receiving resources may be associated with a shared anycast address; in some cases, the one or more sending resources may also be associated with the shared multicast and/or anycast address; the at least one data packet may be sent to the shared multicast address.

The at least one data packet may be received by at least one of the receiving resources;

The method may further comprise one or more of:

Determining, by the at least one receiving resource and upon receipt of the at least one data packet, whether at least one further data packet should be received (or is required) by the at least one receiving resource;

Sending, from the at least one receiving resource to at least one further resource, a request for the at least one further data packet; preferably wherein:

the at least one further resource is a member of the multicast group; and/or the at least one further resource is a member of the anycast group; and/or the request is sent using a multicast transmission, an anycast transmission or a unicast transmission;

Receiving the request for the at least one further data packet from the at least one receiving resource by the at least one further resource;

Sending the at least one further data packet from the at least one further resource to the at least one receiving resource; preferably wherein the at least one data packet is sent to the at least one receiving resource using a unicast transmission.

In an alternative form of wording, such an embodiment may be described as provided in the following clauses. Features from the preceding method may be included in any of the clauses below and vice versa.

Clause 5.1. A method comprising the steps:

sending a request from a (request) sending resource that is a member of resource group to at least one further resource that is a member of the resource group, wherein preferably:

i) the request comprises a request for one or more packets of data; and/or ii) the request is sent as a result of an incomplete receipt of a data transmission sent to the sending resource, preferably wherein the incomplete data transmission was sent to the sending resource and/or at least one further resource via or by a multicast transmission sent to the resource group; and/or iii) the request is sent as any anycast transmission to the (topologically) closest resource in the resource group relative to the sending resource; and/or iv) the request is sent as any multicast transmission to the (topologically) closest resource in the resource group; and/or v) the request is sent as a result of an incomplete receipt (by the sending resource) of a data transmission sent (by a data sending resource) to the (request) sending resource, preferably wherein the request comprises a request for at least one portion (e.g. packet) of data that the (request) sending resource has failed to receive as a result of incomplete receipt of the data transmission.

Clause 5.2. A method according to clause 5.1 wherein the sending resource and/or at least one further resource is or comprises:

a node on a blockchain network; and/or a digital wallet or a digital wallet provider; and/or a cryptocurrency exchange or component thereof; and/or a resource associated with or in communication with one or a plurality of blockchain mining nodes; and/or a service provider arranged to provide blockchain-related services to one or more users; and/or a resource arranged to perform, facilitate or use the result of an SPV verification, the resource may comprise software operative to perform or facilitate a Simplified Verification Payment (SPV) operation, or process the result of an SPV operation.

Clause 5.3. A method according to clause 5.1, or 5.2 wherein:

i) the communication is sent over a public network, preferably the Internet; and/or ii) the at least one group of resources is a multicast group comprising member resources arranged or operative to receive communications sent to a (multicast) address associated with the multicast group; and/or iii) the communication relates to a double spend or double spend attempt within the network; and/or iv) the communication is an alert or other communication comprising blockchain-related data; and/or v) the communication comprises blockchain-related data and/or at least part of a Merkle path or Merkle tree; and/or vi) data for performing or facilitating an SPV-style verification.

Clause 5.4. A method according to clause 5.1, 5.2 or 5.3, and comprising the step providing, from the further resource to the (request) sending resource, one or more portions of data.

Also in accordance with one or more embodiments there may be provided a method comprising:

providing, in response to a request from a (request) sending resource, at least one portion of data to the (request) sending resource; preferably, the (request) sending resource is a member of resource group and the at least one portion of data is provided to the sending resource by or from a further resource that is a member of the resource group;

and wherein preferably:

i) the request comprises a request for one or more packets of data; and/or ii) the request is sent to the further resource as a result of an incomplete receipt of a data transmission sent to the sending resource, preferably wherein the incomplete data transmission was sent to the (request) sending resource and/or at least one further resource via or by a multicast transmission sent to the resource group; and/or iii) the request is sent as any anycast transmission to the (topologically) closest resource in the resource group relative to the sending resource; and/or iv) the request is sent as any multicast transmission to the (topologically) closest resource in the resource group; and/or v) the request is sent as a result of an incomplete receipt (by the sending resource) of a data transmission sent (by a data sending resource) to the (request) sending resource, preferably wherein the request comprises a request for at least one portion (e.g. packet) of data that the (request) sending resource has failed to receive as a result of incomplete receipt of the data transmission.

Clause Set 6:

Additionally, or alternatively, one or more embodiments of the disclosure can be defined in accordance with the following clauses. Any of the clauses defined in clause set 6 may be combined with one or more of the clauses of any other clause set provided herein, or any other feature disclosed herein.

Clause 6.1 A method comprising one or more of the following steps:

1. Forming or providing a group (set) of network nodes;
2. Associating the group of nodes with multicast address; these nodes are now group members of the multicast i.e., they listen to the multicast address;
   in another form of wording, steps 1 and 2 can be phrased as: joining, by one or more nodes, a multicast group;
3. Promoting/advertising/communicating an available service and/or resource, wherein the promoting/advertising/communicating of the service is performed by one or more nodes/members of the group to one or more recipients on a network; the network may or may not be a blockchain network; this communication may be or comprise an invitation to send data to the group members via the multicast address;
4. Promoting/advertising/communicating, by the one or more nodes/members, the group's shared multicast address to the one or more recipients on the network; in one or more embodiments, this may comprise inviting or requesting that the recipient(s) send (e.g. blockchain related) data to the group members at the group multicast address e.g. inviting or requesting blockchain mining nodes to send one or more new blocks to the group's shared multicast address, or transactions, Merkle trees, etc or parts thereof;
   in some embodiments, step 4 (i.e. sharing of the multicast address) may be combined with step 3 (i.e. the advertising of the service to recipients on the network);
5. Promoting/advertising/communicating, by one or more nodes/members of the group, a unique anycast address to the network recipients;
6. Mining, by a blockchain mining node, a new block or blockchain transactions;
7. Sending the new block from the mining node to the group's shared multicast address;
   note; in other embodiments the data requested by the group member(s) and send to them by the network recipients may not comprise or be related to blockchain data such as blocks or transactions; in some embodiments the data could be any type of data, or could be blockchain related data such as whole or partial blocks, whole or partial transactions, data for consensus-related operations, data for validating transactions and/or blocks, data for SPV style verifications, whole or parts of Merkle trees/paths etc 8. Routing the data (e.g. a block or part of a block) to all members of the multicast group; this may be performed over the Internet, using IPv6 transmission
9. intermittently sending, from the one or more nodes/members, requests to the anycast address of the multicast group; preferably, the request includes the unicast address of the sending node;
10. associating a node (member) with the previously promoted anycast address; preferably wherein this is performed upon receipt of a new block or other type of data;
11. Sending, by the node/member a copy of the data (e.g. block or part of a block) to the requesting node via a unicast transmission; this may be performed if a node (multicast group member) with the anycast address receives a request for a copy of the new block;
12. de-assigning the node/group member from the anycast address; in some examples, this is performed upon determination that a predetermined amount of time has passed or a predetermined criteria has been met;
13. listening, by the node/group member, for new data transmissions send to the group's multicast address One or some of the above noted steps can be omitted or performed in a different order from that shown above, or may be conflated with one or more other steps.

Clause Set 7:

Additionally, or alternatively, one or more embodiments of the disclosure can be defined in accordance with the following clauses. Any of the clauses defined in clause set 7 may be combined with one or more of the clauses of any other clause set provided herein, or any other feature disclosed herein.

A method according to this embodiment may be substantially as described herein, and in particular with respect to block header propagation. In accordance with one possible for of wording, such an embodiment may comprise a computer-implemented method that includes the step of sending data from a sending node to a plurality of receiving nodes. Preferably, each of the receiving nodes is associated with an IPv6 multicast address. The data may comprise at least part of a block header of (for) a blockchain block; and a list of one or more blockchain transactions included in the blockchain block that the header relates to.

The method may further comprise the step of using the data, by at least one of the receiving nodes, to identify at least one further blockchain transaction (i.e. at least one "missing" transaction) that the at least one receiving node needs in order to generate the blockchain block. In other words, the at least one receiving node will only be able to generate a complete, full version or copy of the blockchain block if it has a) the blockchain header and b) a complete list of the transactions that are contained in that block. Therefore, the at least one receiving node may perform a check to identify any further transactions that it needs, which were not included in the list sent by the sending node. Identification of the at least one further blockchain transaction may comprise searching for the at least one further blockchain transaction in a stored set of blockchain transactions. The set of stored transactions may be maintained by the at least one receiving node. Additionally or alternatively, it may be accessible to the at least one receiving node or available for access by the node.

The method may comprise the step of obtaining the at least one further (missing) transaction from the stored set of blockchain transactions and using the at least one further transaction and the list of blockchain transaction(s) to generate the blockchain block.

However, if the at least one further transaction is not found in the set of stored transactions, the method may comprise the step of sending a request for the at least one further blockchain transaction from the at least one receiving node to one or more of: the sending node, or the IPv6 multicast address, or one or more further nodes. The method may comprise the step of receiving the request by the sending node from the at least one receiving node; and sending a transmission from the sending node to the at least one receiving node, the transmission comprising the at least one further blockchain transaction. The transmission may be a unicast transmission.

Additionally, or alternatively, the embodiment may be described in the following clauses. Any feature included in any of these clauses may also be incorporated into or combined with the preceding method steps and vice versa.

Clause 7.1 A computer-implemented method comprising the step:

sending, from a sending node to a multicast address, (at least part of) a block header and a list of one or more blockchain transactions and/or blockchain transaction identifiers (TxIDs);

preferably wherein the (IPv6) multicast address is subscribed to by a plurality of receiving (i.e. subscribing) nodes.

In some embodiments, the sending node and/or at least one of the receiving nodes is a node on a blockchain network. Preferably the multicast address is an IPv6 multicast address.

Clause 7.2: A method according to 7.1, and comprising the step:

using, by at least one but preferably all of the receiving nodes, the received information to identify any missing transaction(s) the at least one receiving node needs in order to generate a complete block having the block header;

preferably wherein, a transaction is a missing transaction if it is in the list of one or more transactions but not included in a set of transactions e.g. mempool that is maintained by the at least one receiving node and/or accessible by the at least one receiving node.

Clause 7.3: A method according to 7.1 or 7.2, and comprising the step:

if the receiving node identifies any missing transaction(s), sending a request from the at least one receiving node to the sending node (preferably via a unicast transmission) or the multicast group (preferably via a multicast or anycast transmission) for the missing transaction(s) or transaction identifier(s);

preferably, the request comprises the respective transaction identifier(s) (TxIDs) for the requested missing transaction(s).

Clause 7.4: A method according to 7.1, 7.2 and/or 7.3, and comprising the step:

receiving the request by the sending node from the receiving node.

Clause 7.5: A method according to 7.1, 7.2, 7.3 and/or 7.4, and comprising the step:

sending a transmission from the sending node to the receiving node, the transmission comprising the requested, missing transaction(s) and/or transaction identifier(s);

preferably wherein, the transmission is a unicast transmission; the unicast transmission is preferably sent only to the individual receiving node that has sent the request.

The method may further comprise: using the list of one or more transactions/TxIDs and the at least one requested, missing transaction(s) and/or transaction identifier(s) to generate a blockchain block comprising the block header. This may be performed upon receipt of the transmission by the receiving node. The receiving node may then perform one or more blockchain-related operations e.g. a verification or validation operation.

Clause Set 8:

Additionally, or alternatively, one or more embodiments of the disclosure can be defined in accordance with the following clauses. Any of the clauses defined in clause set 8 may be combined with one or more of the clauses of any other clause set provided herein, or any other feature disclosed herein.

8.1 A method comprising the steps:

sending a transmission (communication) across an electronic network to a multicast address from a sending resource that has Multicast Listener Device (MLD) snooping enabled; and wherein:

i) the transmission comprises blockchain-related data; and/or ii) the multicast address is associated with at least one receiving resource that is:
- a node in a network; this may be a blockchain network or the internet or a telecommunications network;
- a computing resource associated with or controlled by a financial institution; a merchant-controlled resource;
- a cryptocurrency exchange or component thereof;
- a computing resource arranged to perform or facilitate an SPV verification, or use the result of an SPV verification;
- a provider of blockchain-related services; and/or
- a digital wallet or component thereof; and/or
- a resource comprising software operative to perform or facilitate a Simplified Verification Payment (SPV) operation, or process the result of an SPV operation iii) the transmission is or comprises data relating to an alert, preferably wherein the alert is related to, relevant to or arranged for utilisation by one or more nodes on a blockchain network; and/or iv) the transmission comprises:
- blockchain-related data and/or at least part of a Merkle path or Merkle tree; and/or data for performing or facilitating an SPV-style verification, or using the result of an SPV verification.

One or more receiving resources may be associated with the multicast address. In other words: at least one receiving resource may be subscribed to (i.e. listening to) the multicast address. The receiving resource(s) may be referred to as a multicast group. The multicast address may be an IPv6 address. The sending resource and/or receiving resource(s) may be devices or systems on a network. This may be a physical network or a logical network. It may be a VLAN. The sending resource may be a multicast router.

Clause 8.2 A method according to clause 8.1, wherein the sending resource is operative to send the transmission to a list of one or more device ports on the electronic network that have indicated or signalled an interest or intent to receive the transmission. The list may be an IPv6 multicast forwarding table or database.

Clause 8.3 A method according to clause 8.1 or 8.2 wherein:

i. the sending resource is configured and/or operative to monitor MLD messages between receiving resources and/or multicast routers; and/or ii. the sending resource may inspect or utilise the (monitored) MLD messages to generate a list of IPv6 addresses and the respective network interfaces that are connected to the receiving resource(s).

Clause 8.4 A method according to any preceding clause of clause set 8, wherein the sending resource is operative to:

i) send the transmission only to network interfaces that are connected to respective receiving resources which are associated with (subscribed to/listening to network traffic addressed to) the multicast address; and/or ii) not send the transmission if no receiving resources are associated with the multicast address.

Clause 8.5 A method according to any preceding clause of clause set 8, wherein:

One or more of the receiving resources is operative to send a membership report comprising a list of source addresses. The membership report may be sent in INCLUDE or EXCLUDE mode.

The sending and/or receiving resources may be operative to implement MLD Snooping substantially as described in the art at: www.juniper.net/documentation/us/en/software/junos/multicast/topics/concept/mld-snooping-overview-12.html.

Clause Set 9:

Additionally, or alternatively, one or more embodiments of the disclosure can be defined in accordance with the following clauses. Any of the clauses defined in any of clause sets 1 to 8 may be combined with one or more of the clauses of any other clause set provided herein, or any other feature disclosed herein.

Clause 9.1 A computer-implemented method comprising: sending and/or receiving resource for generating, storing, processing, accessing and/or maintaining a packet of data, said packet of data preferably including blockchain related data; determining from the packet of data an allocated address; and sending, at least in part, a transmission of the packet of data from the sending resource across an electronic network to the allocated address.

Additionally, or alternatively, in accordance with an alternative form of wording, embodiments of the disclosure may provide a method for balancing transmission of records of data in a network. The method may comprise: using and/or providing a resource for handling (e.g. generating, storing, processing, accessing and/or maintaining) a record of data; The method may comprise the step of determining an allocated address of the record by parsing/processing the record The allocated address may correspond to a group of one or more resources, wherein the resources may subscribe and unsubscribe to the group. A transmission of the record may be sent from the resource to the allocated address. The allocated address may be determined from a specified portion of the data. The specified portion of data may be a portion of a blockchain transaction or a blockchain block. The specified portion of data may be data or comprise part or all of a transaction ID, or a blockchain block ID, or a portion of metadata in a transaction output etc. A predetermined number of digits from the specified portion of data may be used as a means for identifying a recipient e.g. a machine that is to process the data record. The data may be sent across the network to a recipient resource or group of resources having an address that corresponds to the specified portion of data. For example, data record(s) comprising TX IDs or metadata comprising (e.g. starting with, ending with, or containing) the 8-bit pattern 01101110 may be sent to a machine or group of machines identified by an address or identifier comprising 01101110.

Clause 9.2. The method of clause 9.1, wherein the allocated address is a multicast address associated with a group of receiving resources.

Clause 9.3. The method of any preceding clause, wherein the record includes at least one of: a portion of a transaction (Tx); an output identifier; a hash of a script; the transaction identification (TXID); a blockchain block; and a block header. The output identifier may be an identifier associated with an output in the blockchain transaction (Tx). For example, it may be a UTXO identifier. The hash of a script may be a hash of a script associated with an output of the transaction (Tx) (e.g. a UTXO script).

Clause 9.4. The method of any preceding clause, wherein determining the allocated address includes processing the packet of data to determine a key, and selecting at least one address from a set of addresses using the key, said processing preferably including parsing the packet of data.

Clause 9.5. The method of any preceding clause, wherein the sending resource holds, provides or comprises a data structure including a set of allocated addresses associated with a corresponding set of keys.

Clause 9.6. The method of any preceding clause, wherein the sending resource generates, stores, processes, accesses and/or maintains a (blockchain) block (of zero or more blockchain transactions) comprising a plurality of packets of data, wherein each of the packets of data in the block includes blockchain related data.

The method may comprise the step of: determining for each packet of data in the block an allocated address; and sending, at least in part, a transmission of each packet of data in the block from the sending resource across an electronic network to the respective allocated address.

Clause 9.7. The method of clause 9.6, wherein the block is split into sub-blocks, and the sending resource transmits each sub-block across an electronic network to a corresponding allocated address.

Clause 9.8. The method of clause 9.6 or 9.7, wherein the plurality of packets of data are split in to eight sub-blocks, each sub-block being sent to a corresponding allocated address.

Clause 9.9. The method of any preceding clause, wherein the sending resource additionally or alternatively operates as a receiving resource, the method further comprising: receiving the packet of data and/or the plurality of packets of data, and at least one of: propagating the packet of data to the allocated address. Preferably, propagating the block comprises transmitting a plurality of packets of data to the respective allocated addresses; consolidating the block and/or transmitting the plurality of packets of data for propagation to corresponding allocated address.

Additionally, or alternatively, the method may comprise the step of collecting at least one of the packet of data, plurality of packets of data or block—and then parsing each packet of data to determine a key and propagating each packet of data to at least one address from a set of addresses, using the key.

Clause 9.10. The method of any preceding clause, wherein the sending or receiving resource subscribes to at least one receiving resource and/or at least one multicast group.

Clause 9.11. The method of clause 9.10, wherein the sending or receiving resource subscribes to a multicast address configured to receive at least one packet of data allocated to said multicast address. Preferably, said allocation is determined from the at least one packet of data.

Clause 9.12. The method of clause 9.10 or 9.11, further including the sending resource: subscribing to a group of receiving resources by sending a signal to a network, such as the internet and/or a blockchain network; and/or leaving a group of receiving resources, preferably wherein the resource leaves the group by ceasing to send a signal to the network. Aspects of clause 9 can be combined with clause 9.2.

Clause 9.13. The method of any preceding clause, wherein the packet of data comprises: a communication, notification, message or alert relating to a blockchain related event or activity.

Clause 9.14. The method of any preceding clause, wherein the alert relates to a double spend or double spend attempt within a blockchain network.

Clause 9.15. The method of any preceding clause, wherein the sending and/or receiving resource is arranged, configured and/or operative to perform one or more of the following:

a functionality specified by a blockchain protocol;

a calculation or other operation related to a mining or consensus function specified in a blockchain protocol;

a Simplified Payment Verification (SPV) operation;

the calculation or verification of a Merkle path, proof or root of a Merkle path; a validation of a blockchain transaction before or after it has been written to a blockchain;

a search of a blockchain to identify, locate and/or confirm the presence of a given transaction or block within a blockchain;

generate a blockchain transaction, write a transaction to the blockchain, and/or broadcast a transaction to a blockchain network.

Clause 9.16. The method of any preceding clause, wherein the packet of data comprises at least one of:

at least part of a blockchain transaction;

at least part of a blockchain block;

at least part of a blockchain transaction script;

a Merkle Tree of the block in which said packet of data is recorded;

the Merkle root the block in which said packet of data is recorded;

a Merkle path, which enables the determination of the value for the Merkle root for the block in which said packet of data is recorded, from a hash of said packet of data;

a Merkle proof;

data for use with, or associated with, a consensus mechanism of a blockchain network the result of, or data relating to, a proof-of-stake or proof-of-work operation;

a block identifier (block_ID) associated with the blockchain block;

a transaction identifier (TxID) associated with a transaction (Tx) in the plurality of blockchain transactions within the blockchain block;

a function of the block identifier (block_ID) and the transaction identifier (TxID);

a concatenation of the block identifier (block_ID) and the transaction identifier (TxID);

a digital signature;

an authentication code;

a signature message for determining a transactional state;

a protocol flag;

a discretionary public key (DPK); and a discretionary transaction ID (DTxID).

Clause 9.17. The method of any preceding clause, wherein the sending and/or receiving resource is comprises:

a node in a blockchain network;

a service provider arranged to provide a blockchain-related service;

a computing resource associated with or controlled by a financial institution;

a cryptocurrency exchange or component thereof;

a merchant resource or component thereof;

a digital wallet or component thereof;

a software component operative to perform or facilitate a Simplified Verification Payment (SPV) operation, or process the result of a SPV operation;

a MLDv1 host or MLDv2 host on a network, a network switch or a router.

Clause 9.18. Computer equipment comprising:

memory comprising one or more memory units; and processing apparatus comprising one or more processing units, wherein the memory stores code arranged to run on the processing apparatus, the code being configured so as when on the processing apparatus to perform the method of any of clauses 9.1 to 9.17.

Clause 9.19. A computer program embodied on computer-readable storage and configured so as, when run on one or more processors, to perform the method of any of clauses 9.1 to 9.17.

Clause Set 10:

Additionally, or alternatively, one or more embodiments of the disclosure can be defined in accordance with the following clauses. Any of the clauses defined in any of clause sets 1 to 9 may be combined with one or more of the clauses of any other clause set provided herein, or any other feature disclosed herein.

Clause 10.1 A computer-implemented method comprising: operating a sending resource for generating, storing, processing, accessing and/or maintaining a packet of data, said packet of data preferably including blockchain related data; and sending, at least in part, a transmission of the packet of data from the sending resource across an electronic network to a multicast group, wherein the multicast group makes available the packet of data for an end-user. The packet of data can be made available through controlled access. The controlled access can be managed (i) via controlled access to the multicast group e.g. via subscription, and/or (ii) controlled access to a packet of data. Controlled access can be configured by the sending resource e.g. by implementing controlled access to the multicast group, and/or by securing the packet of data prior to transmission.

Clause 10.2. The method of clause 10.1, further comprising: a receiving resource for storing, processing, accessing and/or maintaining the packet of data.

Clause 10.3. The method of clause 10.2, wherein: the receiving resource subscribes to the multicast group or another multicast group for receiving the packet of data or another packet of data.

Clause 10.4. The method of any preceding clause, wherein: the sending resource transmits a plurality of packets of data, and/or the receiving resource receives a plurality of packets of data.

Clause 10.5. The method of any preceding clause, wherein packet of data is, at least in part, a data stream, such as a multimedia communication channel.

Clause 10.6. The method of any preceding clause, wherein the packet of data has sub-components for providing a plurality of data channels.

Clause 10.7. The method of any preceding clause, wherein the packet of data and/or access to the multicast group is secured and accessible using an access-key and/or a smart contract.

Clause 10.8. The method of clause 10.7, wherein a first access-key is required to access the packet of data, and a second access-key is required to access the multicast group.

Clause 10.9. The method of clause 10.7 or 10.8, wherein the sending resource generates the access-key, and sends the required access-key to at least one of the receiver and an end-user of the packet of data for accessing the packet of data.

Clause 10.10 The method of clause 10.9, wherein the access-key is provided during an exchange using a payment channel and/or a smart contract.

Clause 10.11. The method of any of clauses 10.7 to 10.10, wherein the access-key provides access to the multicast group and/or packet of data for at least one of (i) a fixed period of time, (ii) a fixed quantity of data, (iii) a fixed quantity of units, (iv) a fixed number of packets of data, and (v) unlimited access.

Clause 10.12. The method of any of clauses 10.4 to 10.11, wherein: the sending resource transmits the plurality of packets of data to respective allocated addresses, wherein the allocated addresses are determined from the respective packets of data, or the access key; and/or the receiving resource receives the plurality of packets of data from at least one multicast group and aggregates the packets of data.

Clause 10.13. The method of clause 10.12, wherein the allocated address is a multicast address associated with a group of receiving resources.

Clause 10.14. A computer-implemented method comprising: operating a receiving resource for storing, processing, accessing and/or maintaining a packet of data, said packet of data preferably including blockchain related data; and receiving, at least in part, a transmission of a packet of data via a multicast group that received the packet of data from an electronic network, and consuming the packet of data as an end-user.

Clause 10.15. The method of clause 10.14, wherein the packet of data and/or access to the multicast group is secured and accessible using an access-key, preferably obtained via a payment channel.

Clause 10.16. The method of any preceding clause, wherein the packet of data includes at least one of: a portion of a transaction (Tx); an output identifier; a hash of a script; a transaction identification (TXID); a blockchain block; and a block header. The output identifier may be, for example, a UTXO. The script may be associated with an output provided within a blockchain transaction.

Clause 10.17. The method of any preceding clause, wherein the packet of data comprises at least one of:

at least part of a blockchain transaction;

at least part of a blockchain block;

at least part of a blockchain transaction script;

a Merkle Tree of the block in which said packet of data is recorded;

the Merkle root the block in which said packet of data is recorded;

a Merkle path, which enables the determination of the value for the Merkle root for the block in which said packet of data is recorded, from a hash of said packet of data;

a Merkle proof;

data for use with, or associated with, a consensus mechanism of a blockchain network the result of, or data relating to, a proof-of-stake or proof-of-work operation;
a block identifier (block_ID) associated with the blockchain block;
a transaction identifier (TxID) associated with a transaction (Tx) in the plurality of blockchain transactions within the blockchain block;
a function of the block identifier (block_ID) and the transaction identifier (TxID);
a concatenation of the block identifier (block_ID) and the transaction identifier (TxID);
a digital signature;
an authentication code;
a signature message for determining a transactional state;
a protocol flag;
a discretionary public key (DPK); and
a discretionary transaction ID (DTxID).

Clause 10.18. The method of any preceding clause, wherein the sending and/or receiving resource comprises:
a node in a blockchain network;
a service provider arranged to provide a blockchain-related service;
a computing resource associated with or controlled by a financial institution;
a cryptocurrency exchange or component thereof;
a merchant resource or component thereof;
a digital wallet or component thereof;
a software component operative to perform or facilitate a Simplified Verification Payment (SPV) operation, or process the result of a SPV operation;
a MLDv1 host or MLDv2 host on a network, a network switch or a router;
a vehicle; the vehicle may be an autonomous vehicle or a semi autonomous vehicle;
a drone, which may be autonomous.

In cases where the receiving resource is a vehicle or drone, the data may comprise or be one or more of: traffic related data, map or geographical data; instructions for operating, controlling, directing or influencing the vehicle/drone or its behaviour, an alert or notification, music, video and/or voice communications such as messages and telephone calls.

Clause 10.19. Computer equipment comprising: memory comprising one or more memory units; and processing apparatus comprising one or more processing units, wherein the memory stores code arranged to run on the processing apparatus, the code being configured so as when on the processing apparatus to perform the method of any of clauses 10.1 to 10.18. The computer equipment may comprise or form part of a vehicle or drone.

Clause 10.20. A computer program embodied on computer-readable storage and configured so as, when run on one or more processors, to perform the method of any of clauses 10.1 to 10.18.

Clause Set 11

Additionally, or alternatively, one or more embodiments of the disclosure can be defined in accordance with the following clauses. Any of the clauses defined in clause set 11 may be combined with one or more of the clauses of any other enumerated clause set provided herein, or any other feature disclosed herein.

In one or more embodiments, however, one, some or all of the sending and/or receiving nodes in a group may be full nodes on a blockchain network, or nodes on an overlay network, and the data may comprise (data relating to) unconfirmed transactions that have been verified but not yet written to the blockchain ledger. In such an embodiment, systems and methods may be provided for implementing a mempool (also known as a memory pool) that forms part of, is provided in or is associated with a blockchain network or an overlay network that interacts with the blockchain network. This may be referred to herein as a 'blockchain overlay network'. According to wiki.bitcoinsv.io/index.php/Mining, it is known that 'mempools are temporary transaction stores and can be used to hold transactions grouped in different ways, such as transactions to be mined in the next block, transactions to watch, or transactions which cannot be mined due to an nLocktime/nSequence lock.' Without limitation, the term mempool as used herein may comprise this definition.

In other embodiments, systems and methods may be provided for implementing a UTXO set.

Therefore, there may be provided:

Clause 11.1 A method of implementing a memory pool or a UTXO set of a blockchain network, the method comprising the step of:
sending a transmission from a sending resource to at least one receiving resource, or
receiving a transmission from a sending resource by at least one receiving resource, wherein:
the sending resource and/or at least one receiving resource is a node on a network; and
the transmission is sent using IPv6 multicast and comprises at least part of a blockchain transaction.

In some embodiments, the at least part of a blockchain transaction may comprise a whole blockchain transaction. The transaction may have been validated (verified) by a verifying entity which is operative to verify the transaction in accordance with a blockchain protocol. The transaction may be unconfirmed, waiting to be successfully mined into a block on the blockchain ledger that is associated with the blockchain protocol.

In some embodiments, the at least part of a blockchain transaction may comprise a UTXO.

Clause 11.2 A method according to clause 11.1, wherein
i) the sending resource and/or at least one receiving resource is a full or lightweight node on a blockchain network; or
ii) the sending resource and/or at least one receiving resource is a node on a blockchain overlay network.

Example System Overview

For the purpose of illustration only and with reference to FIGS. 1 to 4, we now provide an example of a computing environment in which one or more embodiments of the disclosure can be put into effect. The reference numerals referred to below refer to FIGS. 1 to 4.

Figure 1:
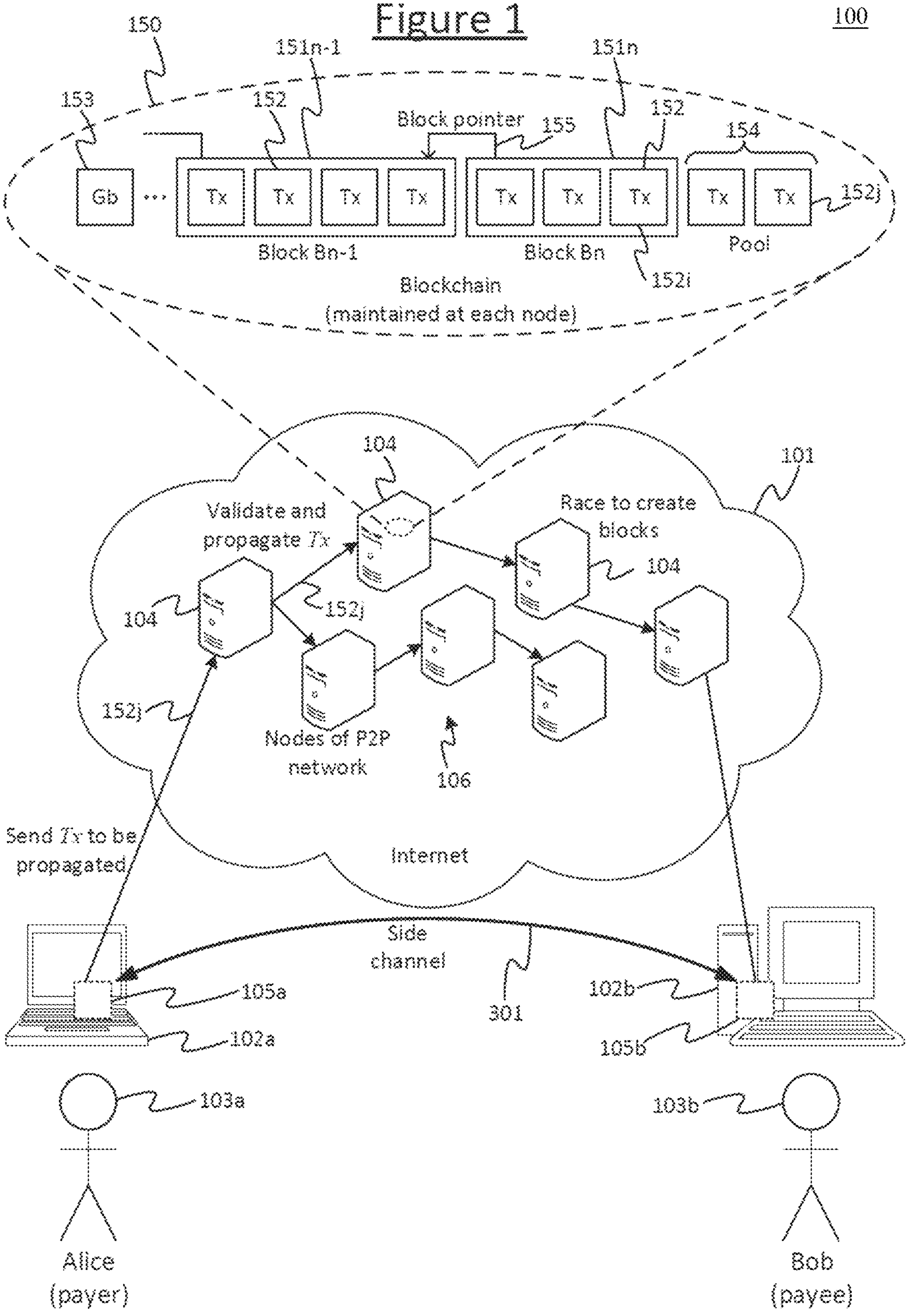
FIG. 1 is a schematic block diagram of a system for implementing a blockchain.

FIG. 1 shows an example system 100 for implementing a blockchain 150. The system 100 may comprise a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as application specific integrated circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the block header (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set (or "pool") 154 of transactions 152 waiting to be incorporated into blocks 151. The ordered pool 154 is often referred to as a "mempool".

This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction **152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the ordered set 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i*** could equally be called the antecedent or predecessor transaction.

The input of the present transaction **152*j* also comprises the input authorisation, for example the signature of the user 103*a* to whom the output of the preceding transaction 152*i* is locked. In turn, the output of the present transaction 152*j* can be cryptographically locked to a new user or entity 103*b*. The present transaction 152*j* can thus transfer the amount defined in the input of the preceding transaction 152*i* to the new user or entity 103*b* as defined in the output of the present transaction 152*j*. In some cases a transaction 152 may have multiple outputs to split the input amount between multiple users or entities (one of whom could be the original user or entity 103*a*** in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction **152*j* (either manually or by an automated process employed by the party), then the enacting party sends the new transaction from its computer terminal 102 to a recipient. The enacting party or the recipient will eventually send this transaction to one or more of the blockchain nodes 104 of the network 106 (which nowadays are typically servers or data centres, but could in principle be other user terminals). It is also not excluded that the party 103 enacting the new transaction 152*j* could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152*j* matches the expected signature, which depends on the previous transaction 152*i* in an ordered sequence of transactions 152. In such an output-based transaction protocol, this may comprise checking that the cryptographic signature or other authorisation of the party 103 included in the input of the new transaction 152*j* matches a condition defined in the output of the preceding transaction 152*i* which the new transaction assigns, wherein this condition typically comprises at least checking that the cryptographic signature or other authorisation in the input of the new transaction 152*j* unlocks the output of the previous transaction 152*i* to which the input of the new transaction is linked to. The condition may be at least partially defined by a script included in the output of the preceding transaction 152*i*. Alternatively it could simply be fixed by the blockchain node protocol alone, or it could be due to a combination of these. Either way, if the new transaction 152*j* is valid, the blockchain node 104 forwards it to one or more other blockchain nodes 104 in the blockchain network 106. These other blockchain nodes 104 apply the same test according to the same blockchain node protocol, and so forward the new transaction 152*j* on to one or more further nodes 104, and so forth. In this way the new transaction is propagated throughout the network of blockchain nodes 104**.

In an output-based model, the definition of whether a given output (e.g. UTXO) is assigned (e.g. spent) is whether it has yet been validly redeemed by the input of another, onward transaction 152*j* according to the blockchain node protocol. Another condition for a transaction to be valid is that the output of the preceding transaction 152*i* which it attempts to redeem has not already been redeemed by another transaction. Again if not valid, the transaction 152*j* will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically, this comprises searching for a "nonce" value such that when the nonce is concatenated with a representation of the ordered pool of pending transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151*n* pointing back to the previously created block 151*n*-1 in the chain. The significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the pool of yet-to-be published transactions 154 at any given time, depending on when they started searching for a solution or the order in which the transactions were received. Whoever solves their respective puzzle first defines which transactions 152 are included in the next new block 151*n* and in which order, and the current pool 154 of unpublished transactions is updated. The blockchain nodes 104 then continue to race to create a block from the newly-defined ordered pool of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction" or "generation transaction". It typically forms the first transaction of the new block 151*n*. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151*n* in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network 106 but do not participate in validating transactions or constructing blocks. Some of these users or agents 103 may act as senders and recipients in transactions.

Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103*a* and his/her respective computer equipment 102*a*, and a second party 103*b* and his/her respective computer equipment 102*b*. It will be understood that many more such parties 103 and their respective computer equipment 102 may be present and participating in the system 100, but for convenience they are not illustrated. Each party 103 may be an individual or an organization. Purely by way of illustration the first party 103*a* is referred to herein as Alice and the second party 103*b* is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g., interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152*j* to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152*j*, it handles it in accordance with the blockchain node protocol and its respective role. This comprises first checking whether the newly received transaction 152*j* meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152*j* passes the test for being deemed valid (i.e., on condition that it is "validated"), any blockchain node 104 that receives the transaction 152*j* will add the new validated transaction 152 to the ordered set of transactions 154 maintained at that blockchain node 104. Further, any blockchain node 104 that receives the transaction 152*j* will propagate the validated transaction 152 onward to one or more other blockchain nodes 104 in the network 106. Since each blockchain node 104 applies the same protocol, then assuming the transaction 152*j* is valid, this means it will soon be propagated throughout the whole network 106.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction 152*j*). Once the proof-of-work has been done for the pool 154 including the new transaction 152*j*, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

UTXO-Based Model

Figure 2:
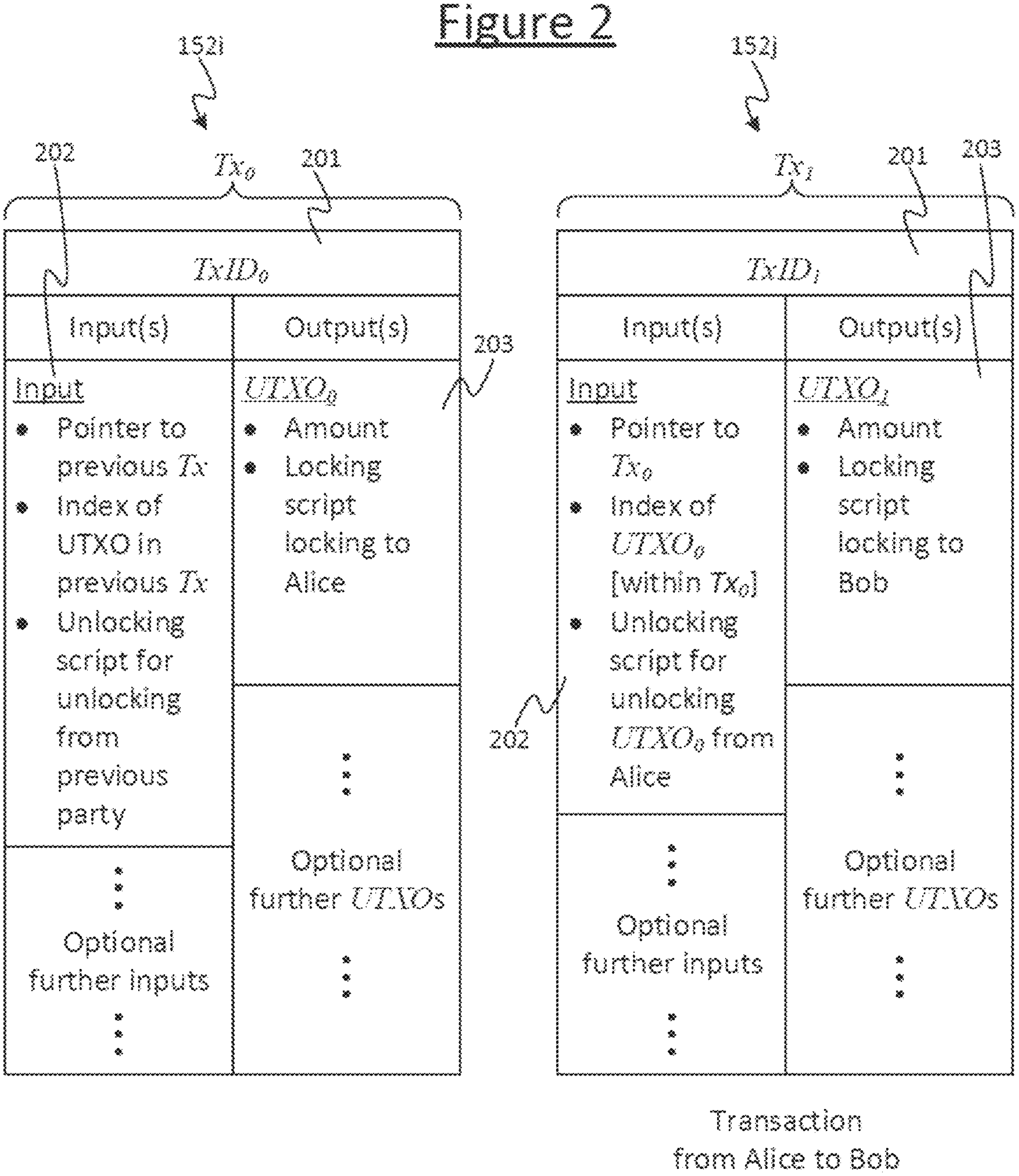
FIG. 2 schematically illustrates some examples of transactions which may be recorded in a blockchain.

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103*a* wishes to create a transaction 152*j* transferring an amount of the digital asset in question to Bob 103*b*. In FIG. 2 Alice's new transaction 152*j* is labelled "$Tx_1$". It takes an amount of the digital asset that is locked to Alice in the output 203 of a preceding transaction 152*i* in the sequence, and transfers at least some of this to Bob. The preceding transaction 152*i* is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e., antecedent) transaction that still has an unspent output 203 locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

$$<Sig\ P_A><P_A>\|[Checksig\ P_A]$$

where "||" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered pool of pending transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e., whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node 104 that successfully includes her transaction 104 in a block 151. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that wins the proof-of-work race to create the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_. . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Side Channel

As shown in FIG. 1, the client application on each of Alice and Bob's computer equipment 102*a*, 120*b*, respectively, may comprise additional communication functionality. This additional functionality enables Alice 103*a* to establish a separate side channel 107 with Bob 103*b* (at the instigation of either party or a third party). The side channel 107 enables exchange of data separately from the blockchain network. Such communication is sometimes referred to as "off-chain" communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 107 may be used to exchange any other transaction related data, such as keys, negotiated amounts or terms, data content, etc.

The side channel 107 may be established via the same packet-switched network 101 as the blockchain network 106. Alternatively or additionally, the side channel 301 may be established via a different network such as a mobile cellular network, or a local area network such as a local wireless network, or even a direct wired or wireless link between Alice and Bob's devices 102*a*, 102*b*. Generally, the side channel 107 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 107. Note therefore that if it is said that Alice and Bob exchange certain pieces of information or data, or such like, over the side channel 107, then this does not necessarily imply all these pieces of data have to be send over exactly the same link or even the same type of network.

Client Software

Figure 3A:
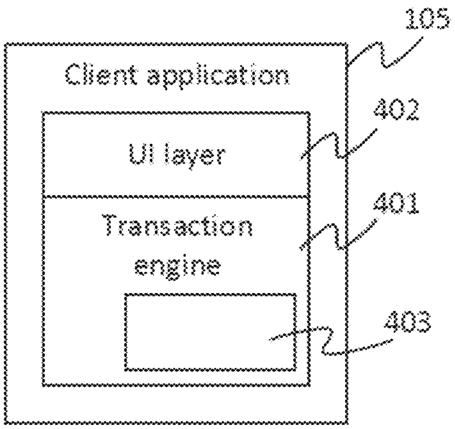
FIG. 3A is a schematic block diagram of a client application.

FIG. 3A illustrates an example implementation of the client application 105 for implementing embodiments of the presently disclosed scheme. The client application 105 comprises a transaction engine 401 and a user interface (UI) layer 402. The transaction engine 401 is configured to implement the underlying transaction-related functionality of the client 105, such as to formulate transactions 152, receive and/or send transactions and/or other data over the side channel 301, and/or send transactions to one or more nodes 104 to be propagated through the blockchain network 106, in accordance with the schemes discussed above and as discussed in further detail shortly.

The UI layer 402 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example, the user output means could comprise one or more display screens (touch or non-touch screen) for providing a visual output, one or more speakers for providing an audio output, and/or one or more haptic output devices for providing a tactile output, etc. The user input means could comprise for example the input array of one or more touch screens (the same or different as that/those used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

Note: whilst the various functionality herein may be described as being integrated into the same client application 105, this is not necessarily limiting and instead they could be implemented in a suite of two or more distinct applications, e.g. one being a plug-in to the other or interfacing via an API (application programming interface). For instance, the functionality of the transaction engine 401 may be implemented in a separate application than the UI layer 402, or the functionality of a given module such as the transaction engine 401 could be split between more than one application. Nor is it excluded that some or all of the described functionality could be implemented at, say, the operating system layer. Where reference is made anywhere herein to a single or given application 105, or such like, it will be appreciated that this is just by way of example, and more generally the described functionality could be implemented in any form of software.

Figure 3B:
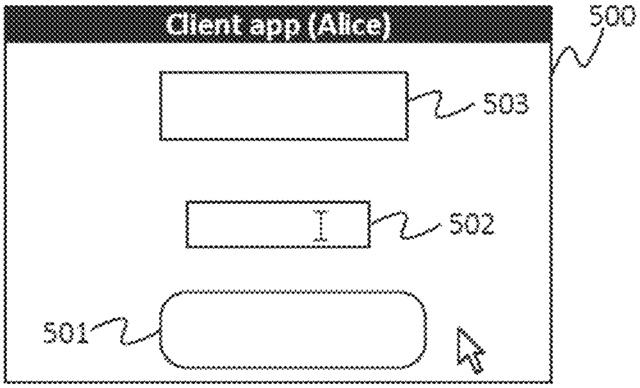
FIG. 3B is a schematic mock-up of an example user interface that may be presented by the client application of FIG. 3A.

FIG. 3B gives a mock-up of an example of the user interface (UI) 500 which may be rendered by the UI layer 402 of the client application 105*a* on Alice's equipment 102*a*. It will be appreciated that a similar UI may be rendered by the client 105*b* on Bob's equipment 102*b*, or that of any other party.

By way of illustration FIG. 3B shows the UI 500 from Alice's perspective. The UI 500 may comprise one or more UI elements 501, 502, 502 rendered as distinct UI elements via the user output means.

For example, the UI elements may comprise one or more user-selectable elements 501 which may be, such as different on-screen buttons, or different options in a menu, or such like. The user input means is arranged to enable the user 103 (in this case Alice 103*a*) to select or otherwise operate one of the options, such as by clicking or touching the UI element on-screen, or speaking a name of the desired option (N.B. the term "manual" as used herein is meant only to contrast against automatic, and does not necessarily limit to the use of the hand or hands).

Alternatively or additionally, the UI elements may comprise one or more data entry fields 502, through which the user can . . . These data entry fields are rendered via the user output means, e.g. on-screen, and the data can be entered into the fields through the user input means, e.g. a keyboard or touchscreen. Alternatively the data could be received orally for example based on speech recognition.

Alternatively or additionally, the UI elements may comprise one or more information elements 503 output to output information to the user. E.g. this/these could be rendered on screen or audibly.

It will be appreciated that the particular means of rendering the various UI elements, selecting the options and entering data is not material. The functionality of these UI elements will be discussed in more detail shortly. It will also be appreciated that the UI 500 shown in FIG. 3 is only a schematized mock-up and in practice it may comprise one or more further UI elements, which for conciseness are not illustrated.

Node Software

Figure 4:
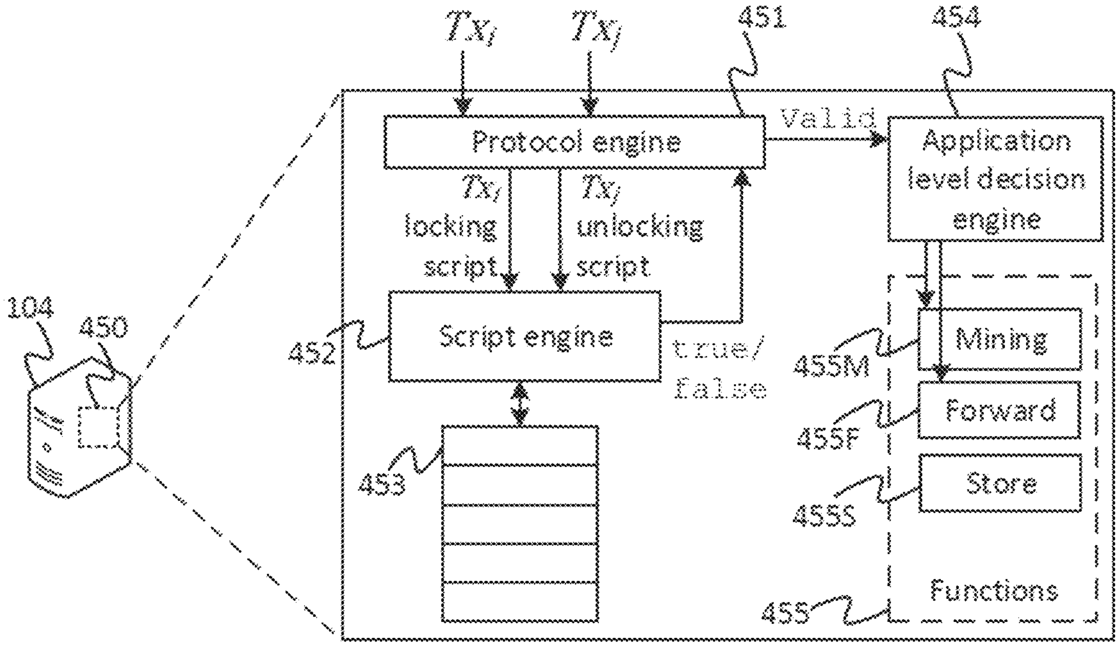
FIG. 4 is a schematic block diagram of some node software for processing transactions.

FIG. 4 illustrates an example of the node software 450 that is run on each blockchain node 104 of the network 106, in the example of a UTXO- or output-based model. Note that another entity may run node software 450 without being classed as a node 104 on the network 106, i.e., without performing the actions required of a node 104. The node software 450 may contain, but is not limited to, a protocol engine 451, a script engine 452, a stack 453, an application-level decision engine 454, and a set of one or more blockchain-related functional modules 455. Each node 104 may run node software that contains, but is not limited to, all three of: a consensus module 455C (for example, proof-of-work), a propagation module 455P and a storage module 455S (for example, a database). The protocol engine 401 is typically configured to recognize the different fields of a transaction 152 and process them in accordance with the node protocol. When a transaction 152*j* ($Tx_j$) is received having an input pointing to an output (e.g. UTXO) of another, preceding transaction 152*i* ($Tx_{m-1}$), then the protocol engine 451 identifies the unlocking script in $Tx_j$ and passes it to the script engine 452. The protocol engine 451 also identifies and retrieves $Tx_i$ based on the pointer in the input of $Tx_j$. $Tx_i$ may be published on the blockchain 150, in which case the protocol engine may retrieve $Tx_i$ from a copy of a block 151 of the blockchain 150 stored at the node 104. Alternatively, $Tx_i$ may yet to have been published on the blockchain 150. In that case, the protocol engine 451 may retrieve $Tx_i$ from the ordered set 154 of unpublished transactions maintained by the node 104. Either way, the script engine 451 identifies the locking script in the referenced output of $Tx_i$ and passes this to the script engine 452.

The script engine 452 thus has the locking script of $Tx_i$ and the unlocking script from the corresponding input of $Tx_j$. For example, transactions labelled $Tx_0$ and $Tx_i$ are illustrated in FIG. 2, but the same could apply for any pair of transactions. The script engine 452 runs the two scripts together as discussed previously, which will include placing data onto and retrieving data from the stack 453 in accordance with the stack-based scripting language being used (e.g. Script).

By running the scripts together, the script engine 452 determines whether or not the unlocking script meets the one or more criteria defined in the locking script—i.e., does it "unlock" the output in which the locking script is included? The script engine 452 returns a result of this determination to the protocol engine 451. If the script engine 452 determines that the unlocking script does meet the one or more criteria specified in the corresponding locking script, then it returns the result "true". Otherwise, it returns the result "false".

In an output-based model, the result "true" from the script engine 452 is one of the conditions for validity of the transaction. Typically there are also one or more further, protocol-level conditions evaluated by the protocol engine 451 that must be met as well; such as that the total amount of digital asset specified in the output(s) of $Tx_j$ does not exceed the total amount pointed to by its inputs, and that the pointed-to output of $Tx_i$ has not already been spent by another valid transaction. The protocol engine 451 evaluates the result from the script engine 452 together with the one or more protocol-level conditions, and only if they are all true does it validate the transaction $Tx_j$. The protocol engine 451 outputs an indication of whether the transaction is valid to the application-level decision engine 454. Only on condition that $Tx_j$ is indeed validated, the decision engine 454 may select to control both of the consensus module 455C and the propagation module 455P to perform their respective blockchain-related function in respect of $Tx_j$. This comprises the consensus module 455C adding $Tx_j$ to the node's respective ordered set of transactions 154 for incorporating in a block 151, and the propagation module 455P forwarding $Tx_j$ to another blockchain node 104 in the network 106. Optionally, in embodiments the application-level decision engine 454 may apply one or more additional conditions before triggering either or both of these functions. For example, the decision engine may only select to publish the transaction on condition that the transaction is both valid and leaves enough of a transaction fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model, a result of "true" could be indicated by a combination of an implicit, protocol-level validation of a signature and an additional affirmative output of a smart contract (the overall result being deemed to signal true if both individual outcomes are true).

The invention claimed is:

1. A computer-implemented method comprising the steps:

associating a first group of resources with an anycast group having a particular anycast address;

associating a second group of resources with a multicast group having a particular multicast address;

sending an initial message from a sending resource to the particular multicast address, the initial message including i) the particular anycast address for the anycast group and ii) data that relates to one or more tasks or processing requests; and in response to receiving the initial message, at least one resource belonging to the multicast group sending a response message to the particular anycast address, wherein the response message communicates acceptance of the one or more tasks or processing requests.

2. The method of claim 1, wherein the sending resource belongs to the anycast group.

3. The method of claim 1, wherein:

i) the initial message is routed to each resource of the multicast group; and/or ii) the multicast address is an IPv6 multicast address.

4. The method of claim 1, wherein the response message is routed to one resource of the anycast group that is topologically closest to the resource of the multicast group that sent the response message.

5. The method of claim 1, further comprising:

in response to receiving a response message, at least one resource of the anycast group determining which resource of the multicast group that has sent a response message is topologically closest to the resource of the anycast group.

6. The method of claim 5, wherein the step of determining which resource of the multicast group that has sent a response message is topologically closest to the resource of the anycast group:

i) uses a traceroute utility; and/or ii) is repeated by each resource in the first group of resources.

7. The method of claim 5, further comprising:

the at least one resource(s) of the anycast group cooperating with such topologically closest resource to perform the one or more tasks or processing requests related to the initial message and/or response message.

8. The method of claim 1, further comprising:

at least one resource of the multicast group deciding not to respond to the initial message in the event that it is busy or cannot perform or fulfil the one or more tasks or processing requests related to the initial message based on certain criteria.

9. The method of claim 1, wherein:

the first group of resources and/or the second group of resources include resources that validate one or more blockchain transactions, miner pools or a set of proof-of-work calculating resources, resources that create a block of transactions using a proof-of-stake consensus, or resources which process data in some way for blockchain and/or cryptocurrency-related purposes.

10. The method of claim 1, wherein:

the one or more tasks or processing relate to blockchain transactions blockchain blocks or other blockchain related data.

11. The method of claim 1, wherein:

the one or more tasks or processing relate to validating one or more blockchain transactions, mining a block of transactions using proof-of-work calculating resources, creating a block of transactions using a Proof-of-Stake consensus mechanism, simplified payment verification, or processing data in some way for blockchain and/or cryptocurrency-related purposes.

12. Computer equipment, comprising:

memory comprising one or more memory units; and processing apparatus comprising one or more processing units, wherein the memory stores code arranged to run on the processing apparatus, the code being configured so as when run on the processing apparatus, the processing apparatus performs a method of:

associating a first group of resources with an anycast group having a particular anycast address:

associating a second group of resources with a multicast group having a particular multicast address;

sending an initial message from a sending resource to the particular multicast address, the initial message including i) the particular anycast address for the anycast group and ii) data that relates to one or more tasks or processing requests; and in response to receiving the initial message, at least one resource belonging to the multicast group sending a response message to the particular anycast address, wherein the response message communicates acceptance of the one or more tasks or processing requests.

13. A non-transitory computer readable medium comprising computer program code configured so as, when run on one or more processors, the one or more processors perform a method of:

associating a first group of resources with an anycast group having a particular anycast address;

associating a second group of resources with a multicast group having a particular multicast address;

sending an initial message from a sending resource to the particular multicast address, the initial message including i) the particular anycast address for the anycast group and ii) data that relates to one or more tasks or processing requests; and in response to receiving the initial message, at least one resource belonging to the multicast group sending a response message to the particular anycast address, wherein the response message communicates acceptance of the one or more tasks or processing requests.

14. The method of claim 1, wherein at least one resource of the multicast group deciding not to respond to the initial message in the event that it is not willing or able to perform or fulfil the one or more tasks or processing requests related to the initial message based on other criteria.

* * * * *